US010067960B2

(12) United States Patent
Levandoski et al.

(10) Patent No.: US 10,067,960 B2
(45) Date of Patent: Sep. 4, 2018

(54) CONTROLLING ATOMIC UPDATES OF INDEXES USING HARDWARE TRANSACTIONAL MEMORY

(71) Applicant: Microsoft Technology Licensing, LLC, Redmond, WA (US)

(72) Inventors: Justin Levandoski, Seattle, WA (US); Ryan Stutsman, Redmond, WA (US); Darko Makreshanski, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 449 days.

(21) Appl. No.: 14/731,379

(22) Filed: Jun. 4, 2015

(65) Prior Publication Data

US 2016/0357791 A1 Dec. 8, 2016

(51) Int. Cl.
*G06F 9/46* (2006.01)
*G06F 12/10* (2016.01)
*G06F 17/30* (2006.01)
*G06F 12/1009* (2016.01)

(52) U.S. Cl.
CPC ......... *G06F 17/30312* (2013.01); *G06F 9/46* (2013.01); *G06F 12/1009* (2013.01); *G06F 17/30306* (2013.01); *G06F 17/30377* (2013.01)

(58) Field of Classification Search
CPC ........ G06F 17/30312; G06F 17/30377; G06F 17/30306; G06F 12/1009; G06F 9/46
See application file for complete search history.

(56) References Cited

U.S. PATENT DOCUMENTS

| 7,395,382 | B1 | 7/2008 | Moir |
| 8,170,997 | B2 | 5/2012 | Lomet et al. |
| 9,003,162 | B2 | 4/2015 | Lomet et al. |
| 9,514,211 | B2 | 12/2016 | Sengupta et al. |
| 9,519,591 | B2 | 12/2016 | Lomet et al. |
| 2007/0055960 | A1 | 3/2007 | Damron et al. |
| 2007/0198519 | A1 | 8/2007 | Dice et al. |

(Continued)

OTHER PUBLICATIONS

Leis et al., Exploiting Hardware Transactional Memory in Main-Memory Databases, Nov. 26, 2013, https://db.in.tum.de/~leis/papers/HTM.pdf, pp. 1-12.*

(Continued)

*Primary Examiner* — Jorge A Casanova
(74) *Attorney, Agent, or Firm* — Rainier Patents, P.S.

(57) ABSTRACT

A current state of one or more entries in a mapping table that are associated with latch-free updates of a data structure that uses indirection mapping tables is accessed. A transformation of the current state of the one or more entries in the mapping table to a transformed state of the entries in the mapping table, is controlled. The controlling includes initiating an atomic multi-word compare-and-swap (MWCAS) operation on a plurality of words using a hardware transactional memory (HTM) resident in a device processor, and the MWCAS operation is performed using hardware primitive operations of the HTM, via the device processor. A transformation of a current state of the data structure to an updated state of the data structure, is controlled, via the transformation of the current state of the one or more entries in the mapping table to the transformed state of the entries in the mapping table.

20 Claims, 16 Drawing Sheets

(56) References Cited

U.S. PATENT DOCUMENTS

| | | | |
|---|---|---|---|
| 2007/0198781 | A1 | 8/2007 | Dice et al. |
| 2007/0233970 | A1 | 10/2007 | Saha et al. |
| 2008/0148262 | A1 | 6/2008 | Dice |
| 2009/0171962 | A1 | 7/2009 | Goodman et al. |
| 2009/0172299 | A1 | 7/2009 | Goodman et al. |
| 2010/0169623 | A1 | 7/2010 | Dice |
| 2011/0145802 | A1* | 6/2011 | Levanoni .............. G06F 9/467 717/151 |
| 2011/0246725 | A1 | 10/2011 | Moir et al. |
| 2013/0346725 | A1 | 12/2013 | Lomet et al. |
| 2014/0181821 | A1 | 6/2014 | Shavit et al. |
| 2014/0258645 | A1 | 9/2014 | Dice et al. |
| 2014/0379991 | A1* | 12/2014 | Lomet ................ G06F 12/0891 711/135 |
| 2015/0074366 | A1 | 3/2015 | Calciu et al. |
| 2015/0268940 | A1* | 9/2015 | Baghsorkhi ............ G06F 8/452 717/160 |
| 2015/0378940 | A1* | 12/2015 | Bradbury ............... G06F 13/24 712/244 |
| 2016/0110403 | A1 | 4/2016 | Lomet et al. |
| 2017/0199818 | A1 | 7/2017 | Lomet et al. |

OTHER PUBLICATIONS

"International Search Report and Written Opinion Issued in counterpart PCT Application No. PCT/US2016/035606", dated Oct. 7, 2016, 11 Pages.

Second Written Opinion dated May 11, 2017 from PCT Patent Application No. PCT/US2016/035606, 6 pages.

Abadi et al., "Transactional Memory with Strong Atomicity Using Off-the-Shelf Memory Protection Hardware," In Proceedingsof 14th ACM SIGPLAN Symposium on Principles and Practice of Parallel Programming (PPoPP'09), 2009, pp. 185-196.

Blundell et al., "Subtleties of Transactional Memory Atomicity Semantics," IEEE Computer Architecture Letters vol. 5, No. 2, 2006, 6 pages.

Calciu et al., "Invyswell: A Hybrid Transactional Memory for Haswell's Restricted Transactional Memory," International Conference on Parallel Architectures and Compilation (PACT'14), Aug. 24-27, 2014, pp. 187-200.

Crain et al., "STM Systems: Enforcing Strong Isolation Between Transactions and Non-transactional Code," Proceedings of the 12th international conference on Algorithms and Architectures for Parallel Processing (ICA3PPT12), 2012, pp. 317-331. Available Jun. 8, 2015 at <<https://hal.inria.fr/hal-00699903/file/RR-7970.pdf>>.

Damron et al., "Hybrid Transactional Memory," In Proceedings of the 12th international conference on Architectural support for programming languages and operating systems (ASPLOS'06), 2006, pp. 336-346.

Lev et al., "PhTM: Phased transactional memory," In Workshop on Transactional Computing (Transact), 2007, 11 pages.

Minh et al., "An Effective Hybrid Transactional Memory System with Strong Isolation Guarantees," In Proceedings of the 34th annual international symposium on Computer architecture (ISCA'07), 2007, pp. 69-80.

Anderson, et al., "Universal Constructions for Multi-Object Operations", In Proceedings of the fourteenth annual ACM symposium on Principles of distributed computing, Aug. 20, 1995, 10 pages.

Chung, et al., "ASF: AMD64 Extension for Lock-Free Data Structures and Transactional Memory", In Proceedings of the 43rd Annual IEEE/ACM International Symposium on Microarchitecture, Dec. 4, 2010, 12 pages.

"cpp-btree", Retrieved on: May 1, 2015, 1 page Available at: https://code.google.com/p/cpp-btree/.

Diaconu, et al., "Hekaton: SQL Server's Memory-Optimized OLTP Engine", In Proceedings of the ACM SIGMOD International Conference on Management of Data, Jun. 22, 2013, 12 pages.

Dice, et al., "Applications of the Adaptive Transactional Memory Test Platform", In Proceedings of 3rd ACM SIGPLAN Workshop on Transactional Computing, Feb. 23, 2008, 10 pages.

"DocumentDB", Retrieved on: May 1, 2015, 3 pages Available at: http://azure.microsoft.com/en-us/services/documentdb/.

Graefe, Goetz, "A Survey of B-tree Locking Techniques", In Journal of ACM Transactions on Database Systems, vol. 35, Issue 3, Jul. 2010, 18 pages.

Gray, et al., "Quickly Generating Billion-record Synthetic Databases", In Proceedings of ACM SIGMOD Record, vol. 23, Issue 2, Jun. 1994, 28 pages.

Harizopoulos, et al., "OLTP Through the Looking Glass, and What We Found There", In Proceedings of the ACM SIGMOD international conference on Management of data, Jun. 9, 2008, 12 pages.

Harris, et al., "A Practical Multi-Word Compare-and-Swap Operation", In Proceedings of 16th International Conference on Distributed Computing, Oct. 28, 2002, 14 pages.

Herlihy, et al., "Transactional Memory: Architectural Support for Lock-Free Data Structures", In Proceedings of the 20th annual international symposium on computer architecture, Jun. 1, 1993, 12 pages.

Levandoski, et al., "The Bw-Tree: A B-tree for New Hardware Platforms", In Proceedings of 29th IEEE International Conference on Data Engineering (ICDE 2013), Apr. 8-11, 2013, pp. 302-313.

Israeli, et al., "Disjoint-Access-Parallel Implementations of Strong Shared Memory Primitives", In Proceedings of the thirteenth annual ACM symposium on Principles of distributed computing, Aug. 14, 1994, 10 pages.

Jacobi, et al., "Transactional Memory Architecture and Implementation for IBM System z", In Proceedings of IEEE/ACM 45th Annual International Symposium on Microarchitecture, Dec. 1, 2012, 14 pages.

Karnagel, et al., "Improving In-Memory Database Index Performance with Intel Transactional Synchronization Extensions", In Proceedings of 20th International Symposium on High-Performance Computer Architecture, Feb. 15, 2014, 12 pages.

Larus, et al., "Transactional Memory", In Communications of the ACM, vol. 51, Issue 7, Jul. 2008, 9 pages.

Lehman, et al., "Efficient Locking for Concurrent Operations on B-Trees", In Journal of ACM Transactions on Database Systems, vol. 6, Issue 4, Dec. 1981, 21 pages.

Leis, et al., "The Adaptive Radix Tree: ARTful Indexing for Main-memory Databases", In Proceedings of the IEEE International Conference on Data Engineering, Apr. 8, 2013, 12 pages.

Leis, et al., "Exploiting Hardware Transactional Memory in Main-Memory Databases", In Proceedings of the 30th IEEE International Conference on Data Engineering, Mar. 31, 2014, 12 pages.

Levandoski, et al., "LLAMA: A Cache/Storage Subsystem for Modern Hardware", In Proceedings of the VLDB Endowment, vol. 6, No. 10, Aug. 2013, 12 pages.

Levandoski, et al., "High Performance Transactions in Deuteronomy", In Proceedings of Seventh Biennial Conference on Innovative Data Systems Research, Jan. 4, 2015, 12 pages.

Levandoski, et al., "The Bw-Tree: A B-tree for New Hardware Platforms", In Proceedings of IEEE Data Engineering Bulletin, vol. 36, No. 2, Jun. 2013, 12 pages.

Lomet, D.B., "Process Structuring, Synchronization, and Recovery Using Atomic Actions", In Proceedings of an ACM conference on Language design for reliable software, Mar. 1997, 10 pages.

Mao, et al., "Cache Craftiness for Fast Multicore Key-Value Storage", In Proceedings of the 7th ACM European conference on Computer Systems, Apr. 10, 2012, 15 pages.

Prout, Adam, "The Story Behind MemSQL's Skiplist Indexes", Published on: Jan. 20, 2014, 7 pages Available at: http://blog.memsql.com/the-story-behind-memsqls-skiplist-indexes/.

Pandis, et al., "PLP: Page Latch-free Shared-everything OLTP", In Proceedings of the VLDB Endowment, vol. 4, No. 10, Aug. 29, 2011, 12 pages.

Rajwar, et al., "Speculative Lock Elision: Enabling Highly Concurrent Multithreaded Execution", In Proceedings of the 34th annual ACM/IEEE international symposium on Microarchitecture, Dec. 1, 2001, 12 pages.

Sewall, et al., "PALM: Parallel Architecture-Friendly Latch-Free Modifications to B+ Trees on Many-Core Processors", In Proceedings of the VLDB Endowment, vol. 4, No. 11, Aug. 29, 2011, 12 pages.

(56) References Cited

OTHER PUBLICATIONS

Shavit, et al., "Software Transactional Memory", In Proceedings of the fourteenth annual ACM symposium on Principles of distributed computing, Aug. 20, 1995, 10 pages.

Srinivasan, et al., "Performance of B+ Tree Concurrency Algorithms", In International Journal on Very Large Data Bases, vol. 2, Issue 4, Oct. 1993, 46 pages.

Yoo, et al., "Performance Evaluation of Intel R Transactional Synchronization Extensions for High-Performance Computing", In Proceedings of the International Conference on High Performance Computing, Networking, Storage and Analysis, Nov. 17, 2013, 11 pages.

Leis, et al., "Exploiting Hardware Transactional Memory in Main-Memory Databases", In Proceedings of IEEE 30th International Conference on Data Engineering, Mar. 31, 2014, 12 pages.

Karnagel, et al., "Improving In-Memory Database Index Performance with IntelR Transactional Synchronization Extensions", In Proceedings of 20th International Symposium on High-Performance Computer Architecture, Feb. 15, 2014, 12 pages.

Herlihy, et al., "Transactional Memory: Architectural Support for Lock-Free Data Structures", In Proceedings of the 20th Annual International Symposium on Computer Architecture, May 16, 1993, 12 pages.

Etessami, et al., "An Abort-Aware Model of Transactional Programming", In Proceedings of the 10th International Conference on Verification, Model Checking, and Abstract Interpretation, Dec. 6, 2008, 25 pages.

Faqeh, et al., "Commercial-Off-the-shelf Hardware Transactional Memory for Tolerating Transient Hardware Errors", Published on: Oct. 20, 2014, 33 pages Available at: http://www.gsd.inesc-id.pt/~mcouceiro/eurotm/finalevent2015/faqeh.pdf.

Fraser, et al., "Concurrent Programming Without Locke", In Proceedings of ACM Trans. on Computer Systems, , vol. 25, Issue 2, May 2007, 59 pages.

Rajwar, Ravi, "Speculation-Based Techniques for Transactional Lock-Free Execution of Lock-Based Programs", Computer Science Dissertation, University of Wisconsin-Madison, 2002, 224 pages.

Feldman, et al., "A Practical Wait-Free Multi-Word Compare-and-Swap Operation", In Proceedings of Many-Core Architecture Research Community (MARC) Symposium, Oct. 28, 2013, 8 pages.

Parri, Jonathan, "An Introduction to Transactional Memory", ELG7187 Topics in Computers: Multiprocessor Systems on Chip, fall 2010, 7 pages.

Saha, et al., "McRT-STM: A High Performance Software Transactional Memory System for a Multi-Core Runtime", In Proceedings of the ACM SIGPLAN Symposium on Principles and Practice of Parallel Programming, Mar. 29, 2006, pp. 187-197.

Calciu et al., "NUMA-Aware Reader-Writer Locks," In 18th ACM SIGPLAN Symposium on Principles and Practice of Parallel Programming (PPoPP'13), Feb. 23-27, 2013, pp. 157-166.

"Intel 64 and IA-32 Architectures Optimization Reference Manual", Published on: Sep. 2014 Available at: http://www.intel.in/content/dam/www/public/us/en/documents/manuals/64-ia-32-architectures-optimization-manual.pdf.

International Preliminary Report on Patentability dated Aug. 3, 2017 from PCT Application No. PCT/US2016/035606, 7 pages.

\* cited by examiner

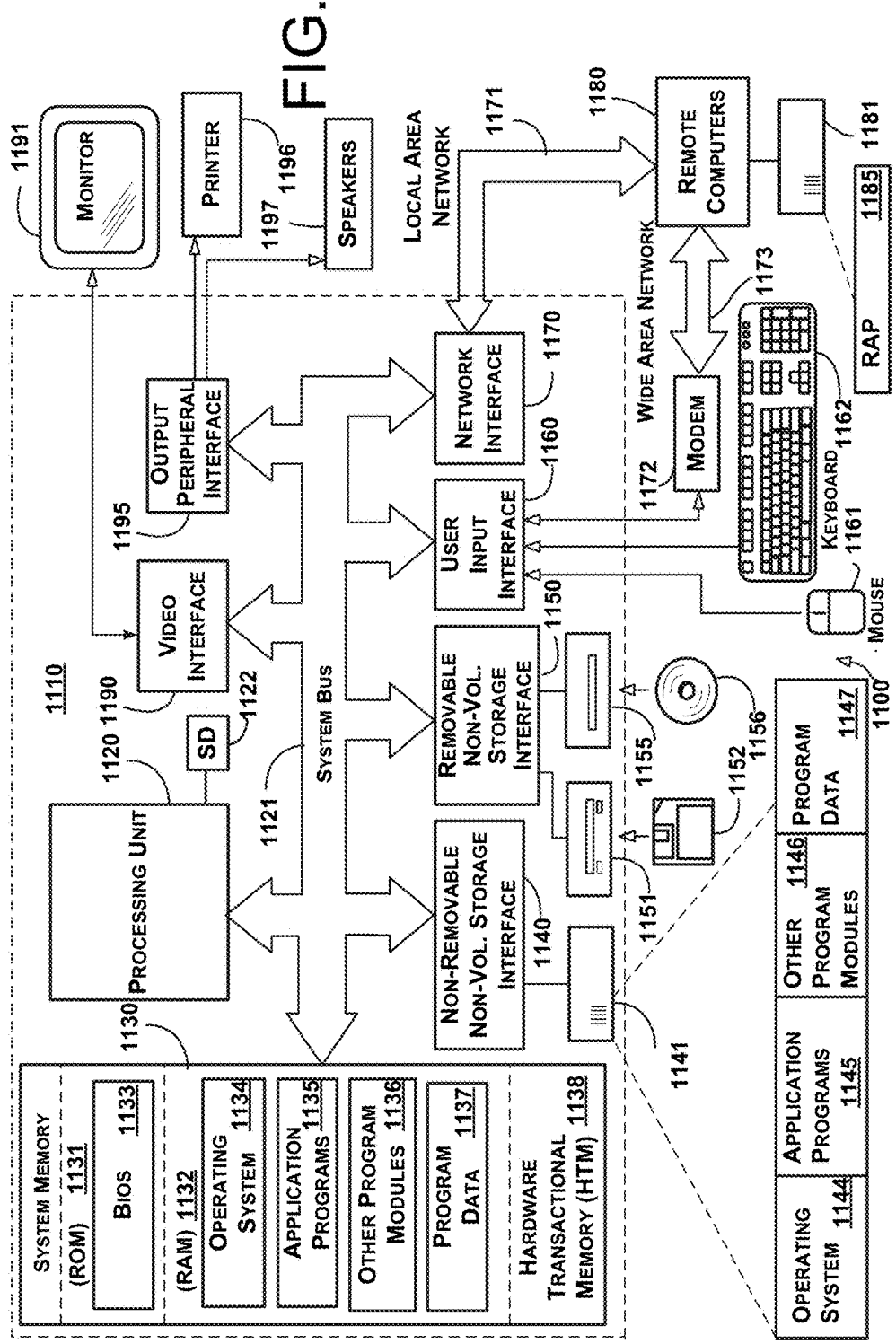

1200

CONTROL A TRANSFORMATION OF A CURRENT STATE OF ONE OR MORE ENTRIES IN A MAPPING TABLE TO AN UPDATED STATE OF THE ENTRIES IN THE MAPPING TABLE IN A LATCH-FREE MANNER BY INITIATING AN ATOMIC MULTI-WORD COMPARE-AND-SWAP (MWCAS) OPERATION ON A PLURALITY OF WORDS USING A HARDWARE TRANSACTIONAL MEMORY (HTM) RESIDENT IN THE DEVICE PROCESSOR, THE MWCAS OPERATION USING HARDWARE PRIMITIVE OPERATIONS OF THE HTM, THE ONE OR MORE MAPPING TABLE ENTRIES ASSOCIATED WITH A LOCK-FREE INDEX OF A DATABASE

> CONTROL A TRANSFORMATION OF A FIRST STATE OF ONE OR MORE ENTRIES IN A MAPPING TABLE TO A SECOND STATE OF THE ENTRIES IN THE MAPPING TABLE THAT ARE ASSOCIATED WITH LATCH-FREE UPDATES THAT ARE ASSOCIATED WITH A DATA STRUCTURE THAT USES AN INDIRECTION MAPPING TABLE THAT INCLUDES THE MAPPING TABLE, THE CONTROLLING INCLUDING INITIATING AN ATOMIC MULTI-WORD COMPARE-AND-SWAP (MWCAS) OPERATION ON A PLURALITY OF WORDS USING A HARDWARE TRANSACTIONAL MEMORY (HTM) RESIDENT IN A DEVICE PROCESSOR, THE MWCAS OPERATION PERFORMED USING HARDWARE PRIMITIVE OPERATIONS OF THE HTM, VIA THE DEVICE PROCESSOR

CONTROLLING ATOMIC UPDATES OF INDEXES USING HARDWARE TRANSACTIONAL MEMORY

BACKGROUND

Users of electronic devices frequently need to access database systems to obtain various types of information and/or perform various operations. Many different techniques have been devised for controlling storage and retrieval of data items. For example, some recent hardware platforms have exploited recent hardware developments such as multi-core processors, multi-tiered memory hierarchies, and various storage devices, in efforts to provide higher performance for electronic devices.

SUMMARY

According to one general aspect, a system may include at least one hardware device processor, and a computer-readable storage medium storing executable instructions that, when executed, cause one or more of the at least one hardware device processor to control a transformation of a current state of one or more entries in a mapping table to an updated state of the entries in the mapping table in a latch-free manner. The transformation is controlled by initiating an atomic multi-word compare-and-swap (MWCAS) operation on a plurality of words using a hardware transactional memory (HTM) resident in the device processor. The MWCAS operation uses hardware primitive operations of the HTM, and the one or more mapping table entries are associated with a lock-free index of a database.

According to another aspect, a transformation of a first state of one or more entries in a mapping table to a second state of the entries in the mapping table that are associated with latch-free updates that are associated with a data structure that uses an indirection mapping table, is controlled. The controlling includes initiating an atomic multi-word compare-and-swap (MWCAS) operation on a plurality of words using a hardware transactional memory (HTM) resident in a device processor. The MWCAS operation is performed using hardware primitive operations of the HTM, via the device processor.

According to another aspect, a current state of one or more entries in a mapping table that are associated with latch-free updates of a data structure that uses an indirection mapping table for lock freedom is accessed. A transformation of the current state of the one or more entries in the mapping table to a transformed state of the entries in the mapping table, is controlled. The controlling includes initiating an atomic multi-word compare-and-swap (MWCAS) operation on a plurality of words using a hardware transactional memory (HTM) resident in a device processor, and the MWCAS operation is performed using hardware primitive operations of the HTM, via the device processor. A transformation of a current state of the data structure to an updated state of the data structure, is controlled, via the transformation of the current state of the one or more entries in the mapping table to the transformed state of the entries in the mapping table.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 11 is a block diagram of an example architecture for atomic updates to mapping tables of database management systems (DBMS).

FIG. 12 is a flowchart illustrating example operations of the system of FIG. 11.

FIG. 14 is a flowchart illustrating example operations of the system of FIG. 11.

DETAILED DESCRIPTION

I. Introduction

Recent developments in hardware platforms have exploited multi-core processors, multi-tiered memory hierarchies, and various storage devices, in efforts to provide higher performance (e.g., speed, efficiency). For example, central processing unit (CPU) changes have included multi-core processors and main memory access that involves multiple levels of caching.

Many main-memory database systems such as SQL SERVER HEKATON advantageously use high-performance lock-free indexing techniques in order to efficiently update and retrieve data. However, designing and implementing lock-free indexing methods (such as a B+-tree) may be difficult, as discussed further below. One example source of this difficulty lies in making state changes to the index that span memory addresses without using mutual exclusion locks. Example techniques discussed herein utilize hardware primitives (e.g., using hardware transactional memory (HTM)) to atomically modify multiple values (e.g., memory addresses), while maintaining both lock-free properties and high performance.

Example techniques discussed herein may include, as one example, a mapping table indirection approach to achieve lock-free updates to an in-memory B+-tree structure (e.g., an in-memory B+-tree structure as discussed with regard to the BW-tree, discussed in LOMET et al., U.S. Pat. No. 9,003, 162), although these example techniques are not limited only to in-memory B+-tree structures, as it is intended that the techniques may be used for many other types of structures as well.

As used herein, a "compare and swap" operation, or a "CAS" may refer to an atomic instruction or operation that may be used in a multithreading environment to achieve synchronization. For example, a CAS may compare the contents of a memory location to a given value and, if they are the same, the CAS modifies the contents of that memory location to a given new value. The atomicity may provide assurance that the new value is calculated based on up-to-date information. For example, if the value had been updated by another thread in the interim, the write would fail. The result of the operation indicates whether it performed the substitution, which may be accomplished either with a Boolean response, or by returning the value read from the memory location (not the value written to it). For example, a compare and swap operation may be implemented via a CAS instruction. One skilled in the art of computing will understand that other instructions or operations may also be used to achieve this (or similar) functionality, without departing from the discussion herein.

Figure 1:
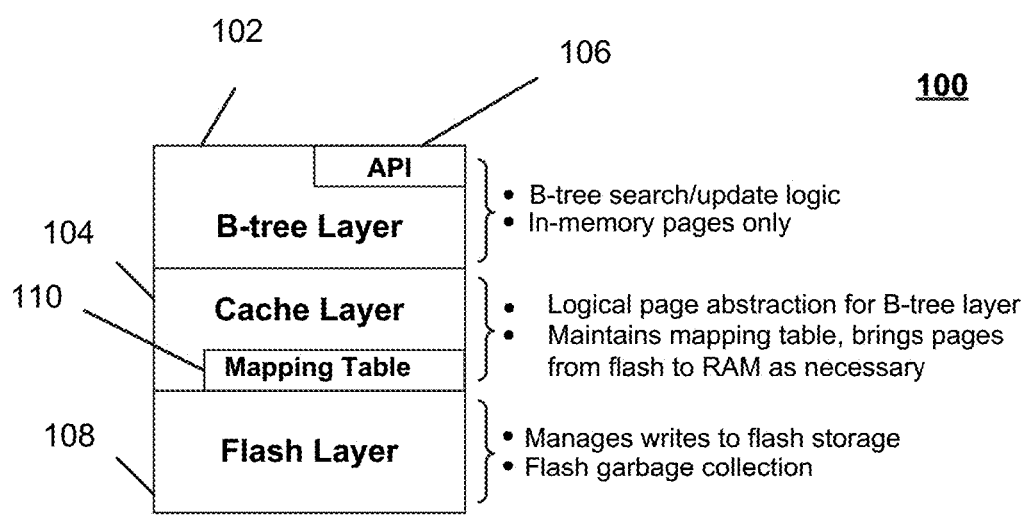
FIG. 1 illustrates an example architectural layering 100 for access methods for cache/storage layers.

FIG. 1 illustrates an example architectural layering 100 for access methods for cache/storage layers. An access method layer 102 (e.g., B-tree layer) is the top layer, as shown in FIG. 1. The access method layer 102 interacts with a Cache Layer 104, which is the middle layer. An application programming interface (API) 106 may be used for activities between the access method layer 102 and the Cache Layer 104. An example storage layer 108 (e.g., flash layer) may interact with a mapping table 110, which may be shared between the cache layer 104 and the storage layer 108. For example, a storage layer may support a log structured flash store. For example, a log structured store may manage both flash and disk storage. This design may be architecturally compatible with existing database kernels, while also being suitable as a standalone or DEUTERONOMY style atomic record store (ARS).

For example, a page abstraction may be supported, and access method implementations for cache/storage layers may also be supported. Further, a transactional component (e.g., a DEUTERONOMY-style transactional component) may be added on top.

For example, an architecture for latch-free, log-structured storage may be designed for multiple access methods. For example, a transactional component may support a transactional key-value store, and may operate with a data component that may include an atomic key-value store. For example, the data component may include a latch-free ordered index and/or a latch free linear hashing index. For example, the data component may further include an example latch-free, log-structured, access-method aware (LLAMA) storage engine.

The example API 106 may be "data opaque," meaning that an example implementation does not "see" (e.g., does not examine, or analyze, or depend on) what the access method (e.g., the access method layer 102) is putting into pages or delta records, and acts independently of what is provided in the pages or delta records by the access method. Thus, example implementations may act in response to specific operations that are not dependent on what is provided by the access method.

In this context, a "page" may refer to an object in storage, which may be accessed via a physical storage address. As used herein, a "page" may be associated with a flexible size, and may represent a page unit of storage that may be distributed over multiple discontiguously stored segments of storage. The storage may include volatile and/or stable storage. In this context, a "logical page" may include a base page and zero or more delta records indicating updates to the page.

In this context, a "key-value store" may generally refer to a form of database management system that may store pairs of respective keys (or terms) and values, as well as retrieve values when a respective key is known. For example, a key-value store may include terms (e.g., keys) with respective lists of objects associated with the respective terms. For example, a key-value store may store indexes that include respective lists of document identifiers that are associated with respective terms.

As shown in FIG. 1, the access method layer 102 may include B-tree search/update logic. Further, the access method layer 102 may work with in-memory pages.

As shown in FIG. 1, the cache layer 104 may include logical page abstraction for the B-tree layer (102). Further, the cache layer 104 may maintain the mapping table 110, and bring pages from flash to RAM when needed.

As shown in FIG. 1, the storage layer 108 may manage write operations to flash storage. Further, the storage layer 108 may handle (at least) flash garbage collection.

For example, an indirect address mapping table may be maintained as part of a cache layer. For example, the indirect address mapping table may map logical pages to physical pages (e.g., by mapping logical page identifiers to physical addresses).

For example, logical page identifiers (PIDs) may be used to link the nodes of the (latch-free) BW-tree structure. Thus, for example, between nodes of the BW-Tree, links may be PIDs, instead of disk or memory addresses. For example, the indirect address mapping table (indirection table) may translate a PID into either the address of a page on stable storage, or the address of the page in memory, thus providing a central location for managing (at least) "paginated" storage.

Tree indexing in which nodes are linked together using physical locations, and in which updates change the physical location, may involve cascading of update changes to the root of the tree. However, an indirection table may sever the connection between physical location and inter-node links, thus enabling the nodes to be "relocated" via updates, and when a page is written to stable storage, without propagating the location change to the root of the latch-free data structure (e.g., a BW-Tree). For example, this "relocation" tolerance may enable both delta updating of the nodes in main memory and structuring of stable storage.

For example, the nodes may be logical and may not occupy fixed physical locations, either on stable storage or in main memory. For example, a "page" for a node may thus provide a policy, in terms of how the nodes may be represented, and in terms of how large they may become. For example, page size may be "elastic," as pages may be split when convenient, as splitting size constraints may be alleviated. Further, pages may be updated, free of "update-in-place" constraints.

For example, state changes to a page (e.g., of a BW-Tree) may be based on prepending a delta record to a prior page state, and installing the state change via an atomic "compare and swap" instruction (CAS instruction) on the page's mapping table slot. For example, this technique may be used both for data changes and management changes (e.g., flushing pages to stable storage), thus utilizing the virtualization of a page and its elasticity to enable convenient use of CAS.

For example, replacing a prior (or current) state of a page with a new (or updated) state of the page may include at least one of replacing a physical address of a first storage object that includes stored information representing the prior state of the page with a physical address of a delta record that is associated with the new state of the page, or replacing a physical address of the first storage object that includes stored information representing the prior state of the page with a physical address of the new state of the page.

For example, replacing the prior state of the page with the new state may include generating a modified version of the current page, or determining another page for replacing the current page, and replacing a physical address of the current page with a physical address of the new state of the page (e.g., the modified version or the other page for replacement), via an atomic compare and swap operation on the indirection mapping table.

For example, a BW-Tree may be immutable, as update-in-place is not performed on pages associated with the BW-Tree. Rather, page updates may be prepended to a page in the form of the delta records. For example, delta records may provide incremental updates to page states in a latch-free manner. For example, to update a page P, a new delta record D may be generated that (physically) points to the current state of P. For example, this current state pointer may be obtained from P's physical address entry in the indirection mapping table. The delta record may represent the new physical memory address of the page. To install this address into P's physical address location in the indirection mapping table, an atomic compare and swap (CAS) instruction may be utilized to remove the current address and install the new address of D. As discussed above, a CAS instruction is an atomic (non-blocking) CPU instruction that compares a given value (e.g., P's old address) to an existing value in a memory location (e.g., the physical address entry in the indirection mapping table), and if these values are the same the instruction writes a new value (e.g., the address of the delta record) to the memory location in the indirection mapping table. After the CAS returns successfully, the update represented by D is live on the page.

For example, since pointers between the example BW-Tree nodes are logical, the CAS on the indirection mapping table may be the only physical pointer change involved to install a page update. Furthermore, this latch-free technique may be the designated way to update a page in an example BW-Tree, and may be uniform across all operations that modify a page. As used herein, a "delta install operation" may refer to usage of the CAS to update a page.

For example, the tree operations may include search and update operations on the BW-Tree. For example, the indirection mapping table may include map indicators mapping logical storage object identifiers to physical storage addresses.

For example, a storage manager may initiate operations on storage areas located on one or more storage devices that include storage space associated with the physical storage addresses. For example, the physical storage addresses may include one or more of storage addresses of pages in volatile memory, or storage addresses of pages in stable storage.

Figure 2A:
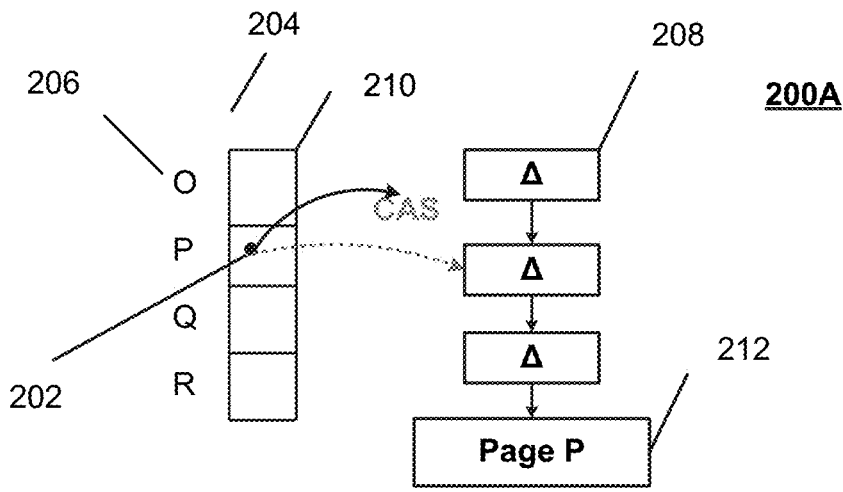
FIGS. 2A-2E illustrate example updates using a mapping table.

For example, as shown in FIG. 2A, a page 212 may be accessed via a mapping table 204 that maps page identifiers (PIDs) 206 to states 208 (e.g., via a "physical address" 210 stored in the mapping table 204), either in main memory cache or on secondary storage. For example, the main memory cache may include random access memory (RAM). For example, the secondary storage may include flash memory. For example, pages 212 may be read from secondary storage into a main memory cache on demand, they can be flushed to secondary storage, and they may be updated to change page state while in the in-memory cache.

For example, substantially all page state changes (both data state and management state) may be provided as atomic operations, in accordance with example techniques discussed herein. One skilled in the art of data processing will appreciate that there are many ways of representing a "physical address" (e.g., other than a 64-bit representation).

A database management system (DBMS), through its API, may provide latch-free page updating via a compare and swap (CAS) atomic operation on the mapping table 204 (e.g., in lieu of a conventional latch that guards a page from concurrent access by blocking threads). For example, the CAS strategy may advantageously increase processor utilization and improve multi-core scaling.

For example, updates to the mapping table may be bracketed in hardware transactions in order to atomically update multiple table "slots" at once, resulting in multiple state changes to the index (e.g., B+-tree nodes splits or merges); this may be referred to below as a "multi-word compare and swap" (MWCAS) technique. These example techniques may introduce overhead, so example optimizations may be utilized (as discussed herein) to enable these example techniques to advantageously perform substantially as well as state-of-the-art lock-free designs.

In this context, a "transaction" may refer to a single unit of transactional functionality, which includes one or more operations (instructions) to be performed on various objects (e.g., database objects, key-value store objects, etc.). For example, a single "transaction" may include many different operations, to be performed (executed) as a unit, such that all such operations are successfully completed, or none of them succeed, at the termination of the transaction's execution. For example, a transaction may be characterized as an atomic unit of consistency and recovery. For example, a transaction may include multiple data manipulation and definition statements constituting a single transaction.

For example, transactions may be characterized as ACID: Atomic (meaning all or nothing), Consistent (if a user writes his program correctly for his application when executed all by itself, then it will work correctly inside a transaction where there may be concurrent activity going on in the system outside of the transaction), Isolated (changes that the transaction makes cannot be seen until the transaction is finished (committed) or which disappear if the transaction is aborted) and Durable (i.e., even if the system crashes at an inopportune time, the results of a committed transaction are guaranteed to persist). For example, in "serializability theory," transactions may be considered serializable if they can be viewed as having the same effects as if they were executed in some serial order. Transactions provided by current HTM implementations apply to operations performed in volatile memory only; therefore current HTM transactions encompass only a subset of the ACID guarantees. For example, since HTM transactions are memory-only, they may not provide durability (the "D" in ACID) nor recoverability guarantees.

Computer systems using transaction processing may employ a commit protocol to insure that no permanent change is made in a data item, or no change visible to other nodes of the system, until a specified "commit" is executed. In this context, to "commit" a transaction generally may refer to installing the results of a transaction in a data base. The ability to commit implies that the database system is capable of not installing the results of a transaction if the transaction is aborted. Not all transactions that are started eventually commit. A transaction that does not commit is said to abort. Among the reasons a transaction might abort are that power might fail, a system might crash, a concurrency conflict with another transaction might arise, or a user (or his application program) might detect another error and explicitly abort.

For example, a number of processes may be executing on various nodes, with each able to provisionally perform the actions of a transaction in a way such that the actions can be "undone" if the transaction needs to be aborted.

For example, "conflicting transactions" may refer two or more transactions including at least one transaction which may, at least potentially, access data updated by another one of the transactions. Thus the results generated by at least one of the conflicting transactions will depend on the order in which the transactions are performed.

A commit protocol may have several properties. For example, it may involve atomicity of transactions. Once a transaction is committed, the commit either reaches a totally completed state, or not complete at all, with no partial completion, so if a site or any part of a distributed system crashes during a commit operation, the system recovers to a state where all partially-completed parts are removed. Further, the system may be able to "forget" the outcome of commit processing after a time, i.e., not continue to carry stale data, since the likelihood of needing the data decreases rapidly with time when no crash occurs.

For systems that support "undo" operations, the system may abort a transaction by "undoing" its actions, if any, and "forgetting" the transaction.

For systems that support locks, a "data lock" is a mechanism for assigning exclusive rights to a datum or record in a data base. For such systems, a first transaction may lock a particular piece of data so as to ensure that no other transaction accesses that data until the first transaction commits or aborts.

Generally, in computing, a cache may refer to a component that transparently stores data so that future requests for that data can be served faster. For example, the data that is stored within a cache may be values that have been computed earlier or duplicates of original values that are stored elsewhere. If requested data is stored in the cache (cache hit), the request can be served by simply reading the cache, which is comparatively faster. Otherwise (cache miss), the data has to be recomputed or fetched from its original storage location, which is comparatively slower. Hence, the greater the number of requests that can be served from the cache, the faster the overall system performance becomes.

As discussed further herein, an example "global elided lock" approach may be utilized to achieve a multi-word compare-and-swap that brackets all accesses to the mapping table in a hardware transaction.

Also as discussed further herein, an example "infinite retry" approach may be utilized to achieve a multi-word compare-and-swap that only brackets multi-slot updates to the mapping table in hardware transactions (e.g., singleton accesses are left out of transactions). This approach may advantageously achieves a high level of performance, as discussed further below.

Also as discussed further herein, example techniques may be utilized for guaranteeing progress in the "infinite retry" approach that aim to reduce spurious aborts of hardware transactions.

Thus, example techniques discussed herein may utilize devices such as HTM to provide multiple atomic updates within a lock-free index while maintaining high performance.

Recently, each generation of central processing units (CPUs) has increased the number of processors on a chip, resulting in a substantial amount of parallelism. Transactional memory (TM) has been proposed as one solution to help exploit this parallelism while easing burdens on programmers. For example, TM allows for atomic execution of all of the loads and stores of a critical section, thereby relieving the programmer from worrying about fine-grained concurrency—an engineering task that may be very difficult. Hardware transactional memory (HTM) shipping in commodity CPUs offers a promising transactional memory implementation that may achieve advantageous performance, and is widely available.

In main-memory databases, multi-core scalability may provide good performance. This may be important at the access method (indexing) layer since it is a hot path for data manipulation and retrieval. As an example, fine-grained locking (latching) protocols have been used for achieving index concurrency. In main-memory systems, however, locks (latches) may be a substantial bottleneck since there is no input/output (I/O) on the critical path, which has led to the design and implementation of "lock-free" indexing techniques. For example, there exist commercial systems with lock-free indexes. For example, MEMSQL uses lock-free skip-lists, while MICROSOFT's HEKATON main-memory engine uses the BW-TREE, a lock-free B-tree. To achieve lock-freedom, these designs use atomic CPU hardware primitives such as compare-and-swap (CAS) to manipulate index state. While efficient, lock-free designs may be difficult to design and engineer since atomic instructions are typically limited to a single word, and non-trivial data structures may involve multi-word updates (e.g., B-tree splits and merges).

Lock-free index designs are in use to achieve great performance in main-memory systems. Recently, HTM has been used to seamlessly transform single-threaded indexing methods into high performance multi-threaded indexes by speculatively and concurrently executing operations. This approach may simplify the design and implementation of the index; it provides multi-word atomic updates and pushes conflict adjudication into the hardware transaction.

The discussion herein involves an interplay of HTM and lock-free indexing techniques. HTM currently involves several limitations and pathologies—such as high abort rates due to capacity limits—that may make it currently undesirable as a general solution for production systems that encounter a wide variety of data and workloads. For example, HTM may exhibit undesirable performance in high contention scenarios. For example, an HTM-based approach may abort readers that touch a "hot" data item, while lock-free designs may neither block nor abort readers - for any reason. As discussed further herein, HTM may be used to help simplify lock-free design techniques while maintaining good performance. Using HTM as a building block to create a multi-word CAS instruction may advantageously help simplify lock-free indexing design with minimal performance impact.

In accordance with example techniques discussed herein, HTM may be used to provide concurrency in a B-tree architecture using the CPP-BTREE from GOOGLE. For example, this approach may provide advantageous scalability for moderately sized data sets with small (8-byte) fixed-size keys and payloads. However, for data that mirrors many real-world deployments (e.g., with variable-length keys, large record counts), this HTM-based approach may exhibit undesirable performance; in some cases performing less advantageously than serialized performance. Further, HTM may currently not be suitable for implementing fine-grained B-tree concurrency techniques such as lock-coupling.

In the discussion below, a comparison is made between the HTM-based B-tree to the BW-TREE, a lock-free B-tree of MICROSOFT that is currently used in MICROSOFT products including the HEKATON main-memory database management system (DBMS). For example, lock-freedom may involve extra mechanisms (e.g., epoch protection for memory safety and maintenance due to copy-on-write). However, a lock-free approach may never abort readers (due to copy-on-write semantics). For example, this feature may be advantageous to read performance, especially when reading data with a high update rate. Meanwhile, an HTM-based approach that performs update-in-place may abort readers if their read set overlaps with a write, degrading read performance by up to four times (4×) in a worst-case scenario.

As discussed further below, using HTM as a technique for performing a multi-word CAS operation (MWCAS) may advantageously help simplify lock-free design, since it allows atomic installation of operations that span multiple arbitrary locations (e.g., for B-tree page splits and merges). For example, the MWCAS is an advantageous application of HTM since it avoids many abort pathologies (since transactions are small) and provides advantageous performance.

Developing high-performance parallel access schemes for main-memory data structures may be a tedious and error prone task leading to deadlocks and race conditions. For example, transactional memory may ease this burden by delegating conflict detection and resolution from the developer to the system. Using transactional memory, a programmer may specify a set of CPU operations and the system ensures atomic and isolated execution of these operations, or aborts on conflict. For example, for transactional memory, a programmer may specify such a set of CPU operations as:

$$\text{atomic } \{\text{Withdraw } (A, X) \text{ Deposit } (B, X)\} \tag{1}$$

The system ensures atomic and isolated execution of these operations of (1) above, or aborts on conflict (e.g., all or nothing).

For example, HTM piggybacks on existing features in CPU micro-architectures to support transactions. For example, CPU caches may be used to store transaction buffers and provide isolation. For example, the CPU cache coherence protocol can be used to detect conflicting transactional accesses. With these modifications, CPUs can provide hardware support for transactional memory with low overhead to runtime. There are constraints, however, that may limit HTM's usefulness. For example, one potential constraint is that the read and write set of a transaction must fit in cache in order for it to be executed. Thus, many properties may limit a transaction's size including: cache capacity, cache set associativity, hyper-threading, translation lookaside buffer (TLB) capacity and others.

For example, a TLB may refer to a cache that memory management hardware uses to improve virtual address translation speed. For example, device processors may include one or more TLBs in memory management hardware, especially for hardware that utilizes paged or segmented virtual memory.

Another potential constraint is on transaction duration. Many hardware events, such as interrupts, context switches or page faults, may abort a transaction. Furthermore, conflict detection may be done at the granularity of a cache line, which may lead to cases of false sharing where aborts occur due to threads accessing and modifying separate items on the same cache line.

These potential issues may make it difficult for HTM implementations to guarantee that a transaction will ever succeed even if it is "infinitely" retried. Therefore, to attempt to guarantee forward progress, a non-transactional fallback may be provided. For example, one solution may involve using lock elision (see, e.g., RAJWAR, et al., "Speculative Lock Elision: Enabling Highly Concurrent Multithreaded Execution," In *Proceedings of the 34th Annual ACM/IEEE International Symposium on Microarchitecture*, (2001)) that may guarantee progress by falling back to non-transactional lock-based synchronization. For example, a potentially advantageous feature of lock elision is that it is substantially identical to programming with locks. For example, a programmer may utilize lock elision by using a set of CPU operations such as:

$$\text{AcquireElided (Lock) Withdraw } (A, X) \text{ Deposit } (B, X) \text{ ReleaseElided (Lock)} \tag{2}$$

However, a difference from traditional lock-based synchronization exists in that lock elision first attempts to execute a critical section transactionally, and only if the transaction aborts will it execute the critical section by acquiring the lock. For example, lock elision may advantageously provide optimistic concurrency for programs that use simple coarse grain locks. For example, the hardware may ensure that as long as concurrent threads execute critical sections that do not have conflicting accesses, they can run in parallel, thus achieving performance similar to using fine-grained synchronization. Lock elision involves including the lock word in the read set of a transaction, so that the transaction aborts when another thread acquires the lock (thus causing a conflict). Thus, once a thread resorts to non-transactional execution by taking the lock, all other concurrently executing transactions will abort, stalling overall progress.

Referring to the HASWELL CPU, INTEL supports transactional memory, representing a mainstream CPU that includes such functionality. It is understood to resemble the approach discussed above: a 32 KB L1 8-way set associative cache buffers read and write sets and conflict detection is performed at cacheline granularity. It may be understood (see, e.g., "INTEL 64 and IA-32 Architectures Optimization Reference Manual," September 2014) that there may be no guarantee that a transaction will eventually succeed even if it is infinitely retried. Therefore, lock elision or some other form of non-transactional fallback may be provided in all cases to ensure forward progress. INTEL's transactional synchronization extensions (TSX) provide two interfaces.

For example, Hardware Lock Elision (HLE) adds two new instruction prefixes (XACQUIRE and XRELEASE) for use in conjunction with instructions that implement a lock, thus providing the lock elision functionality as explained above.

For example, Restricted Transactional Memory (RTM) adds several instructions (XBEGIN, XEND and XABORT) to compose custom transaction logic. For example, RTM allows the specification of a custom fallback code path in case a transaction aborts. For example, RTM may provide more flexibility when implementing lock elision. For example, a critical section may be transactionally retried a specified number times before resorting to acquiring the lock (instead of relying on INTEL's default HLE implementation).

The discussion herein is (at least) directed to main-memory B+-tree implementations due to their ubiquity in database systems and to make experimental comparisons for HTM-based versus lock-free indexing. Such comparisons are currently difficult with other high performance main-memory indexing methods. For example, ART (see, e.g., LEIS, et al., "The Adaptive Radix Tree: ARTful Indexing for Main-memory Databases," In *Proceedings of the IEEE International Conference on Data Engineering*, Apr. 8, 2013) may provide advantageous single-threaded performance, but may not have a multi-threaded lock-free counterpart.

The CPP-BTREE is a high performance memory-optimized B+-tree, which supports single-threaded access. The CPP-BTREE does not include the fine-grained locking techniques and concurrency protocols (e.g., page locks or lock-coupling) common in many current B+-tree implementations, and thus it is discussed further herein, since HTM may be incompatible with fine-grained concurrency techniques (as discussed further below). Further, HTM may seamlessly provide scalable multi-threaded performance to non-thread-safe data structures. Internally, the CPP-BTREE is a typical B+-tree, as data is stored within the leaf nodes, and internal index nodes contain separator keys and pointers to child pages.

An example BW-tree may exist as a completely lock-free B+-tree, meaning threads may never block for any reason when reading or writing to the index. For example, BW-trees are currently used in a number of MICROSOFT products including the SQL SERVER HEKATON (see, e.g., DIACONU, et al., "Hekaton: SQL Server's Memory-Optimized OLTP Engine," In *Proceedings of the ACM SIGMOD International Conference on Management of Data*, Jun. 22, 2013) and AZURE DOCUMENTDB.

The BW-tree's lock-freedom is based on its maintenance of a mapping table that maps logical page identifiers (LPIDs) to virtual addresses. All links between BW-tree nodes are LPIDs, meaning a thread traversing the index will go through the mapping table to translate each LPID to a pointer to the target page.

Figure 2B:
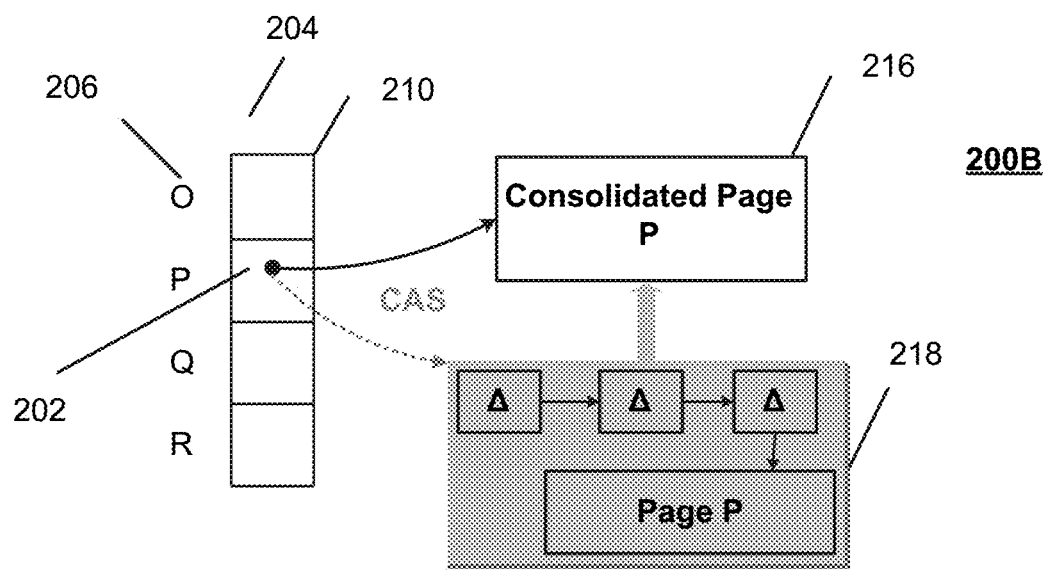

For example, lock-free updates may be realized by the BW-tree by utilizing copy-on-write to update pages. For example, an update may create a delta record describing the update and prepend the delta record to the target page. For example, delta records allow for incremental updates to pages in a lock-free manner. For example, the delta may be installed using an atomic compare-and-swap (CAS) that replaces the current page address in the mapping table 204 with the address of the delta. FIG. 2A depicts a delta update to a page P 212; the dashed line in FIG. 2A represents P's original address, while the solid line in FIG. 2A represents P's new address 208. If the CAS fails (e.g., due a concurrent update to the page winning the CAS) the losing updater will retry. For example, as shown in FIG. 2B, pages may be consolidated once a number of deltas accumulate on a page (218), to prevent degradation of search performance. For example, consolidation may involve creating a new compact, search-optimized page 216 with all delta updates applied, that replaces the old page version using a CAS, illustrated in FIG. 2B as performing a CAS on the physical address 202 in the mapping table 204, for the page identified as page P.

An example issue in lock-free B+-tree design involves structure modification operations (SMOs) such as page splits and merges that introduce changes to more than one page, as multiple arbitrary pages may not be updated using a single CAS. For example, the BW-tree may break an SMO into a sequence of atomic steps; each step may be installed using a CAS to a single page.

An example lock-free page split is discussed below; an example discussion of page deletes may be found, e.g., in LEVANDOSKI, et al., "The Bw-Tree: A B-tree for New Hardware Platforms," In *Proceedings of 29th IEEE International Conference on Data Engineering* (ICDE 2013), Apr. 8-11, 2013, pp. 302-313.

Figure 2C:
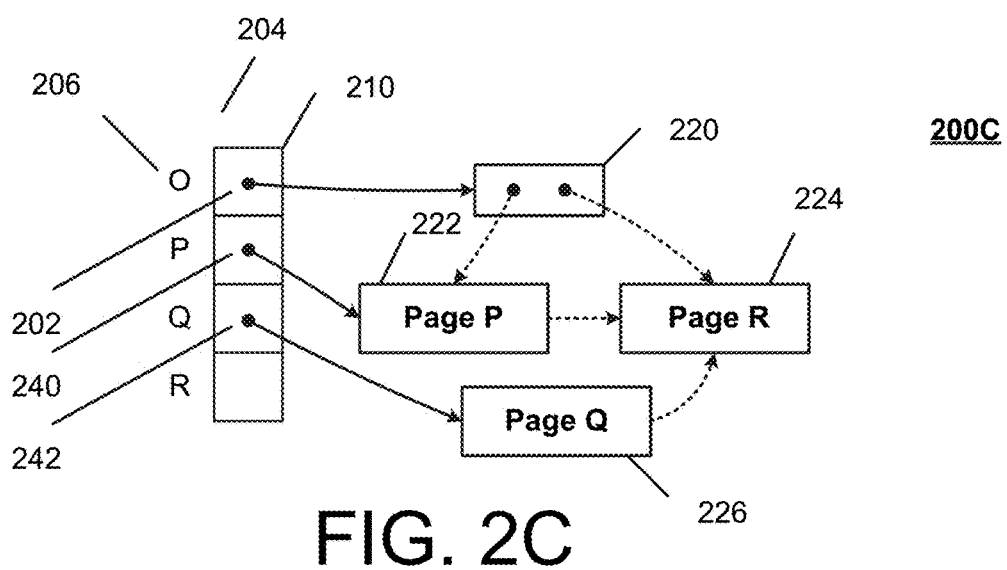
Figure 2D:
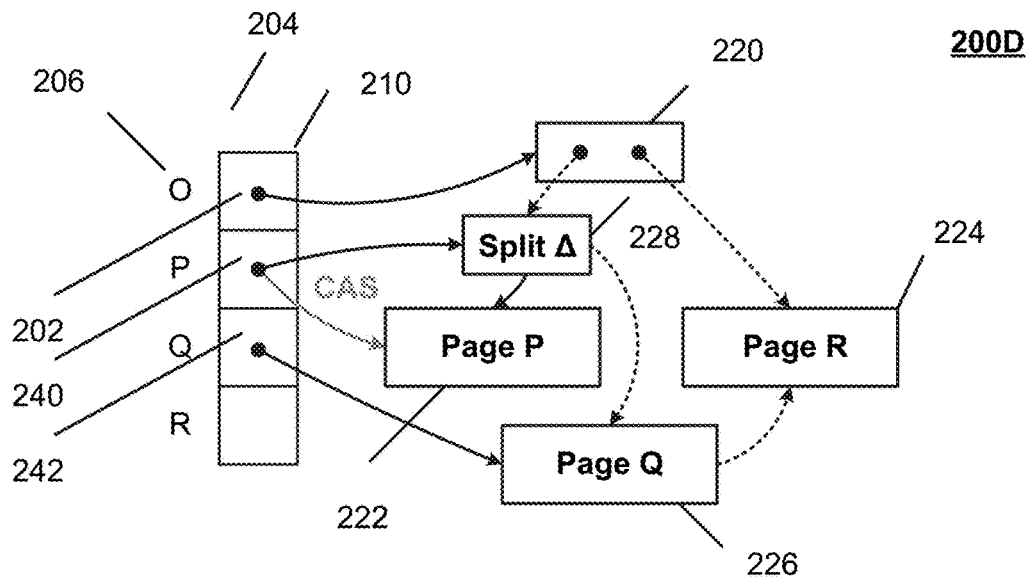
Figure 2E:
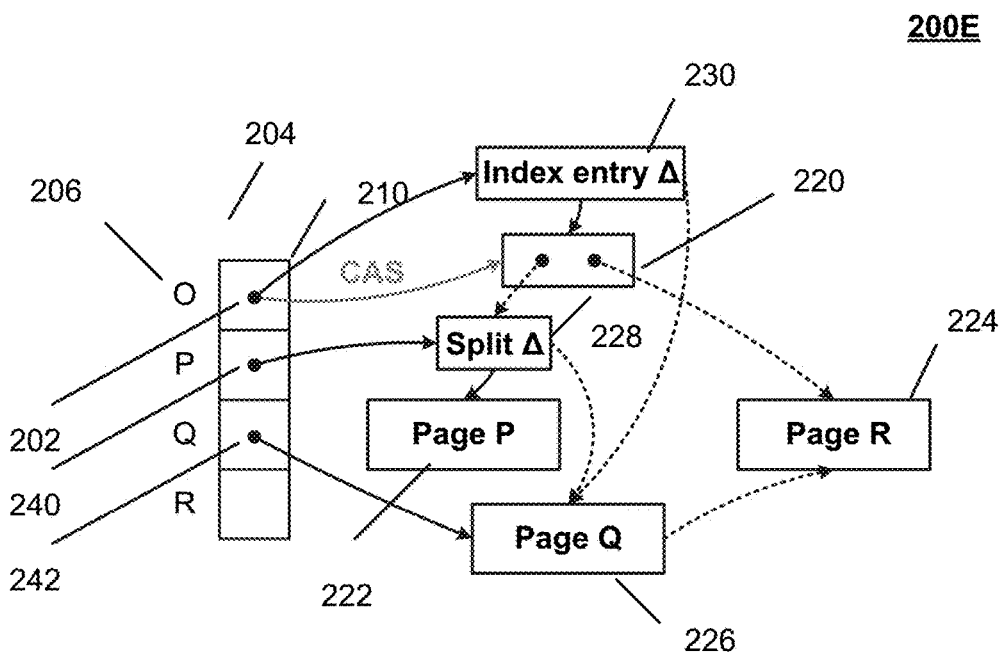

As depicted in FIGS. 2C-2E, the example lock-free page split works in two phases and is based on a B-link design. An existing page P 222 is split by first creating a new page Q 226 with records from the upper half of P's key range. Next, a "split delta" 228 is installed (240) on P 222 that logically describes the split and provides a side-link to the new sibling Q 226. A (search key, PID) index term 202, 206 is then posted (242) for Q 226 at parent O with a delta record 230, again using a CAS, as shown in FIG. 2E. As shown in FIG. 2E, page R 224 represents the right branch of the node 220 after the split. In order to ensure that no thread has to wait for an SMO to complete, a thread that encounters a partial SMO in progress will complete it before proceeding with its own operation, as discussed further below. The lock-free design is advantageously efficient, however this performance is realized at a cost: it may be difficult to design and implement non-trivial lock-free data structures such as a B+-tree.

Experiments discussed below compare and contrast the CPP-BTREE and BW-tree implementations under several workloads in order to highlight differences between using the HTM and lock-free approaches to concurrent B-Trees. Each experiment pre-loads one of the two types of trees. Then, a fixed number of threads are each assigned to continuously perform either lookup operations or update operations. In experiments, record count, record size, key size, access skew, and lookup/update thread count are varied for each structure. Further, several approaches for HTM conflict handling and lock-free techniques may be compared against basic spinlocks. Results discussed below cover operation throughput and hardware transaction abort rates.

Unless otherwise stated, workloads focus on trees of 4 million records either using 8-byte keys and 8-byte payloads (61 MB total) or 256-byte payloads (1.2 GB total). Experiments use 4 hardware threads issuing lookups and 4 hardware threads issuing updates.

Table 1 below describes an example machine used for experiments discussed below. An example HASWEL1 generation CPU is equipped with INTEL (TSX).

TABLE 1

| Processor | INTEL XEON E3-1245 v3 ("HASWELL") |
| --- | --- |
| | 3.4 GHz, up to 3.8 GHz turbo |
| | 4 cores, 8 hardware threads total |
| Caches | 64 B cacheline size |
| | Private 32 KB L1D per core, 8-way set associative |
| | Private 256 KB L2 per core, 8-way set associative |
| | Shared 8 MB LLC, 16-way set associative |
| TLBs | L1-DTLB 64 4 KB, 32 2 MB, and 4 1 GB pages |
| | 4-way set associative |
| | L2-Combined TLB 1024 4 KB or 2 MB pages |
| | 8-way set associative |
| DRAM | PC3-12800 DDR3 (800 MHz), 2 channels |
| OS | WINDOWS SERVER 2012 R2 |

B-Trees may advantageously use hardware lock elision; there exist B-Tree implementations that currently use spinlocks or read-write locks for multi-core parallelism. HTM lock-elision involves little effort and overhauls existing lock-based data structures with optimistic synchronization often simply by replacing the underlying synchronization library.

As discussed below, lock elision may be potentially be used for B-Trees by analyzing its potential fit with two lock-based synchronization schemes: a single global lock and fine-grained lock-coupling. For example, as discussed herein, HTM may effectively parallelize simple B-Trees that use a single (elided) global lock, though this may involve some limitations. Additionally, an example HTM interface may be incompatible with lock-coupling.

Hardware lock elision may provide a simplicity of coarse-grain locks with a performance of fine-grain locks or lock-free programming. Therefore, an example approach may involve wrapping every B-Tree operation in a critical section protected by one global lock. Then, lock acquisition may be hardware elided to provide inter-operation parallelism.

Figure 3:
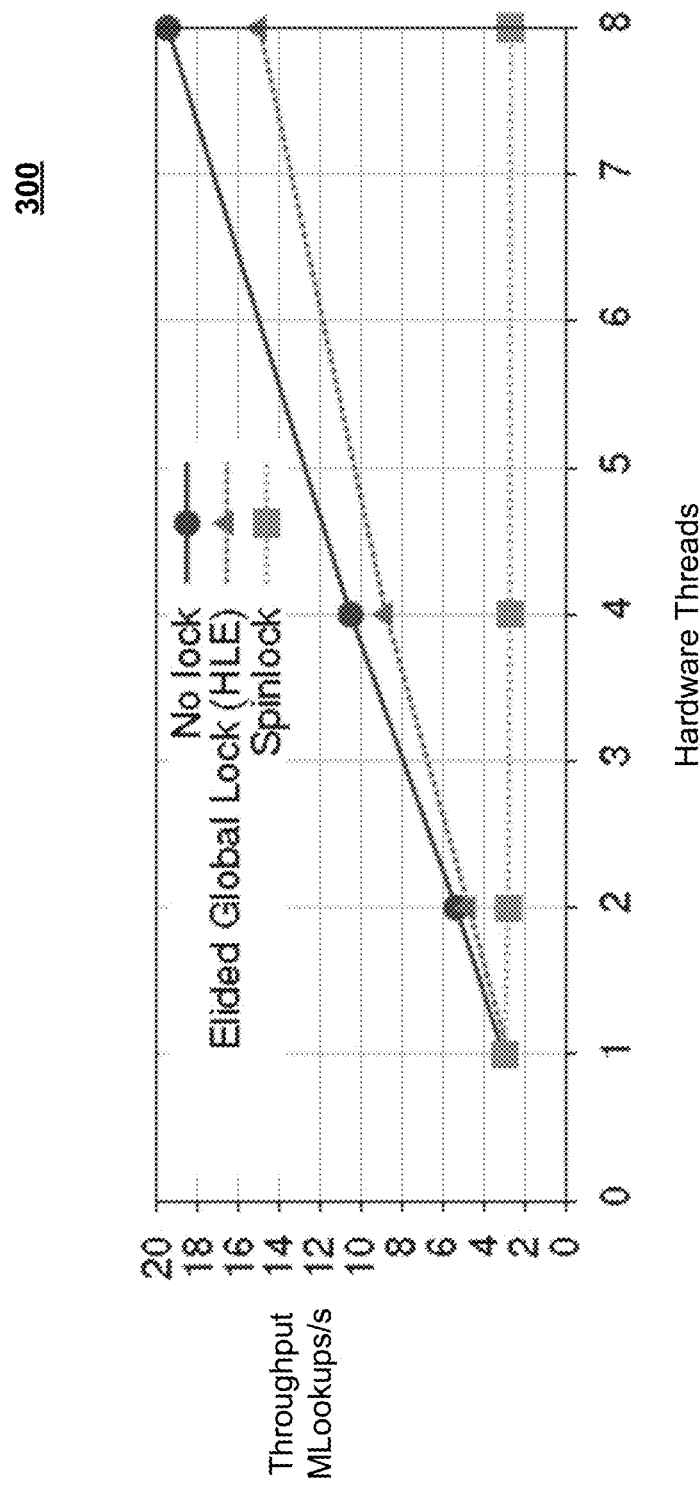
FIG. 3 illustrates example experimental data results indicating read operation throughput results.

For example, this approach may be evaluated using an existing B+-Tree implementation (e.g., the CPP-BTREE) optimized for single-threaded in-memory access and parallelized using a global elided lock. To understand the potential of the approach and to understand its overheads, a graph 300 of FIG. 3 compares read operation throughput against this tree using an elided lock, a conventional spinlock, and no lock at all (which may represent "ideal" performance and may only be safe under a read-only workload). The tree is pre-filled with 4 million 8 byte keys and payloads, and the number of threads driving a read-only uniform-random access workload is varied. For example, experimental results have shown that, with small workloads with fixed-length keys and payloads, HTM may provide high throughput with little effort. For example, basic HLE may perform only about 33% slower than unsynchronized access.

However, the advantageous results of the global elided lock on a simple workload may not hold in general. An example complicating issue stems from capacity limits on hardware transactions. Under the hood, hardware tracks the read and write set of all the cache-lines accessed by a thread in a transaction. One example HTM implementation may leverage its 32 KB L1 cache to buffer a transaction's writes and to track its read and write set. Any eviction of a cacheline from the transaction's write set may result in an abort. Hence, no transaction can write more than can fit in L1. Associativity may compound this; for example, its L1 may be 8-way associative, and, for example, writes to 9 distinct cachelines that map to the same cache set may result in an abort. Since read sets are also tracked in L1, they may suffer from similar capacity constraints, though read sets may be protected by an unspecified second-level cache (potentially the load unit). Finally, hyper-threading may also induce capacity-related aborts, since hardware threads on a common core may share an L1 cache and other resources.

Overall, these capacity constraints make HTM challenging to use when parallelizing B-Trees; many of the properties that determine the HTM abort rate for a given tree may not be known until run-time. For example, a tree's key size, payload size, total size, and address access patterns may all affect performance. For example, tree size may be problematic because the number of nodes accessed during a traversal grows logarithmically with tree size, which increases the required transaction size as well. In the end, these HTM capacity constraints mean trees with large keys and/or large payloads may not parallelize advantageously when using a global elided lock.

To investigate the impact of these limitations in practice, the percentage of transactions that abort due to capacity constraints for read-only tree traversals while varying the key and payload sizes were experimentally measured. For example, the tree was pre-populated with varying number of records and the workloads were run with hyper-threading both on and off. The transaction abort rate was measured, which is correlated with the achieved parallelism. If the abort rate is close to 0% all operations are executed in a transaction and maximum parallelism is achieved (similar to the HLE performance trend as shown if FIG. 3). If the abort rate is close to 100% lock-elision falls back to acquiring the global lock leading to no parallelism (similar to the spin lock performance trend as shown if FIG. 3).

Figure 4:
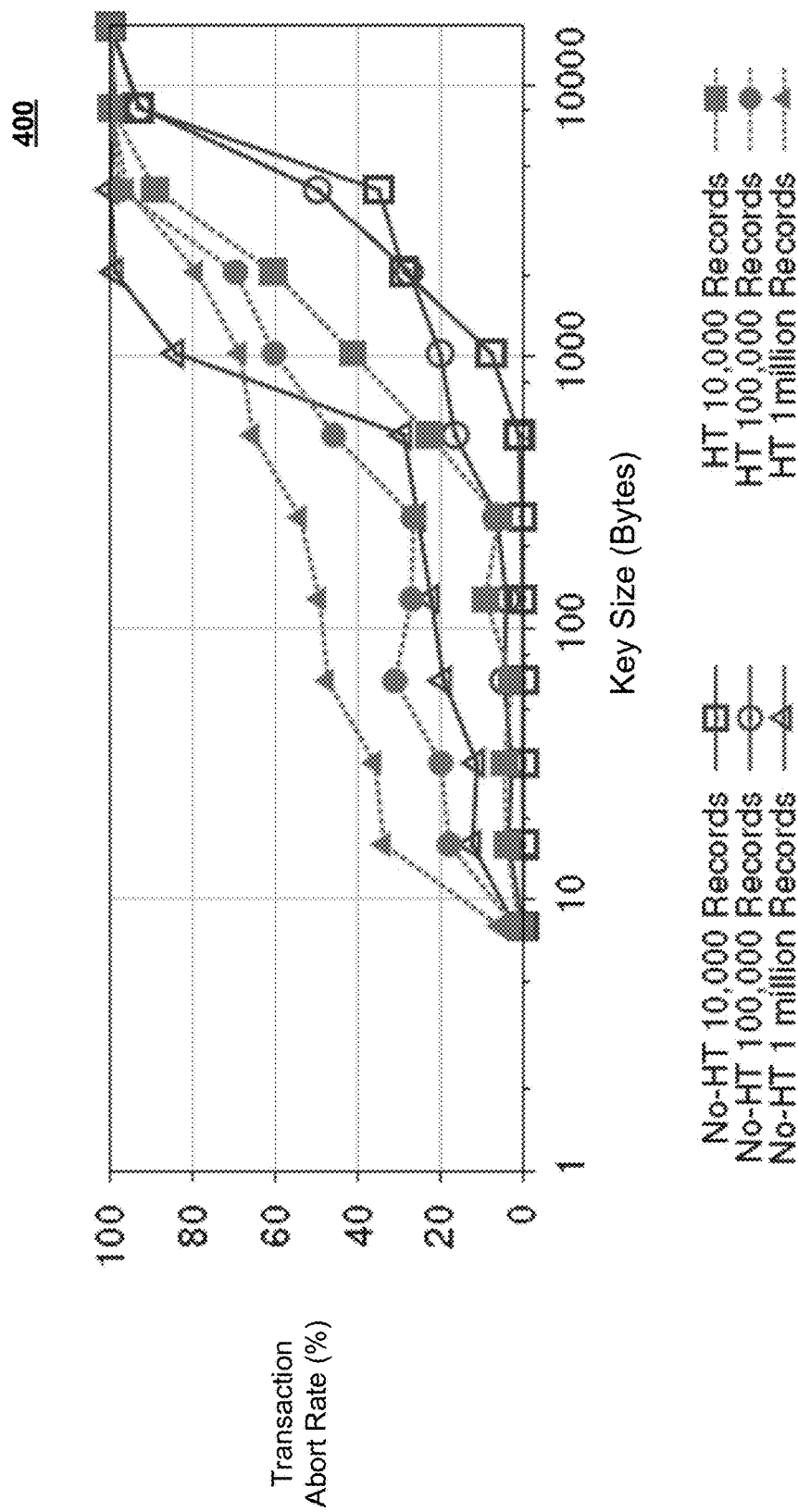
FIG. 4 illustrates example experimental data results measuring abort rates.
Figure 5:
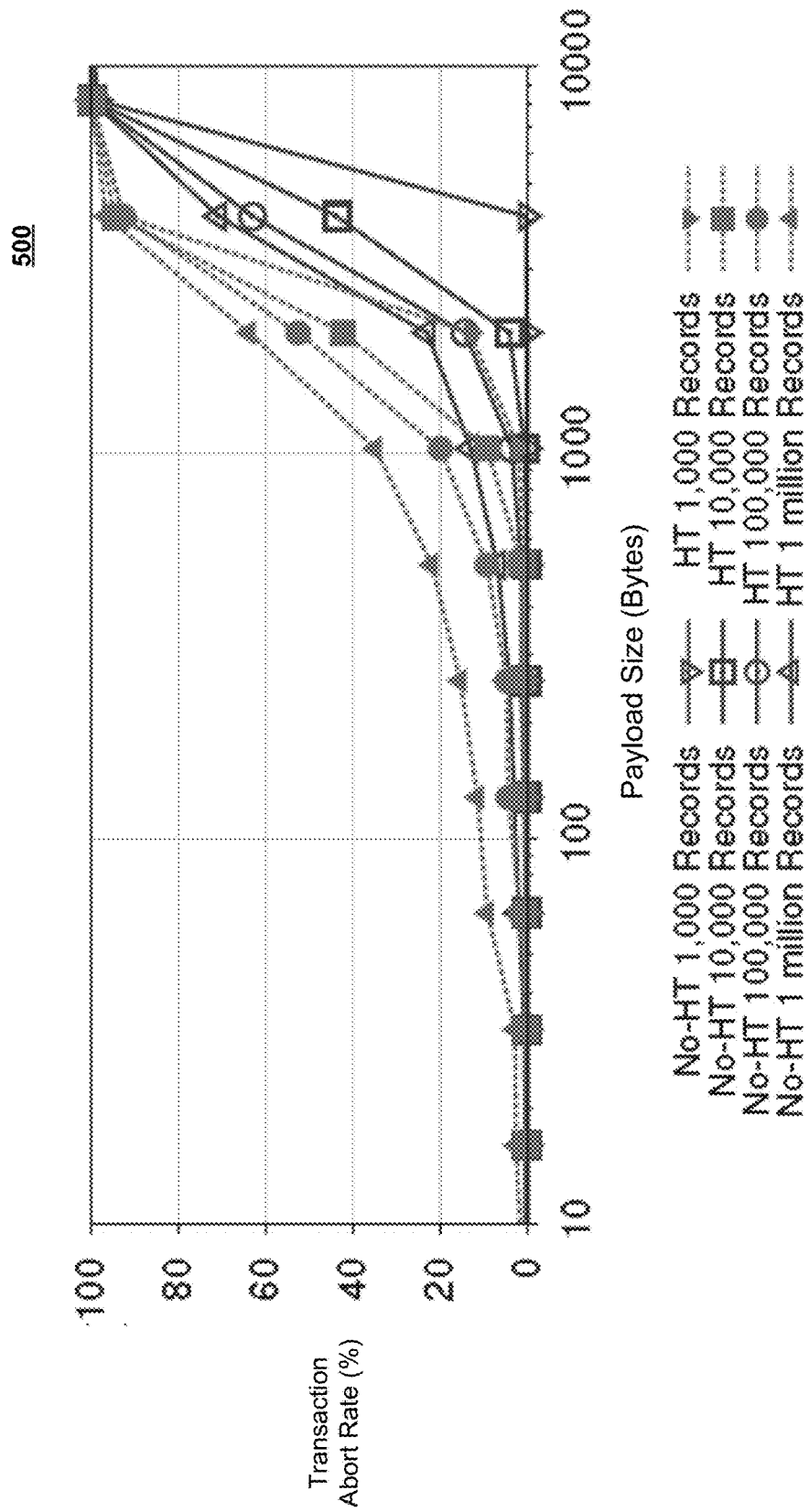
FIG. 5 illustrates example experimental data results measuring abort rates.

FIGS. 4-5 illustrate experimental transaction abort rates for various key and payload sizes. For example, FIG. 4 illustrates an example abort rate versus key size with fixed-size 8-byte payloads, while FIG. 5 illustrates an example abort rate versus payload size with fixed-size 8-byte keys. The results as shown in FIGS. 4-5 illustrate that with this simple approach, even trees with relatively small keys and payloads may not always parallelize. With an example HTM almost all transactions abort with payloads larger than a few kilobytes (e.g., as shown in FIG. 5), even though the transaction buffers are stored in a 32 KB cache, illustrating the limiting effect of the 8-way cache set associativity and cache sharing with hyper-threading. Key size may be even more constrained, since a single transaction encounters many keys during each lookup. Abort rates may climb to 50% with just 64 byte keys in a 1 million record tree (e.g., as shown in FIG. 4).

Hardware capacity is one example source of difficulty for employing HTM; another difficulty lies in predicting performance due to transactional conflicts. The discussion above avoided conflicts and isolated the impact of hardware capacity by using a read-only workload. In practice, HTM may only be desired when a workload has potentially conflicting updates. When a transaction aborts due to a true data conflict performance is naturally impacted. However, there are two other potentially problematic ways that transaction aborts may affect performance. First, speculation is not free: transaction startup overhead and the resources it consumes while running can result in wasted work. Second is a so-called "lemming effect" (see, e.g., DICE, et al., "Applications of the Adaptive Transactional Memory Test Platform," In *Proceedings of 3rd ACM SIGPLAN Workshop on Transactional Computing*, Feb. 23, 2008). For example, an HTM may involve all transactions eventually falling back to using a lock when transactions abort, since it may make no forward progress guarantees. When a transaction falls back and acquires the lock, all other transactions in the critical section abort and cannot restart until the lock is released. The effect is that execution is fully serialized until the lock is released—even if the other transactions operate on non-conflicting cache lines. Consequently, concurrency is aggressively restricted, often unnecessarily. This issue may become apparent in high skew workloads where execution is almost entirely serialized even for transactions that operate on low-contention values.

Figure 6:
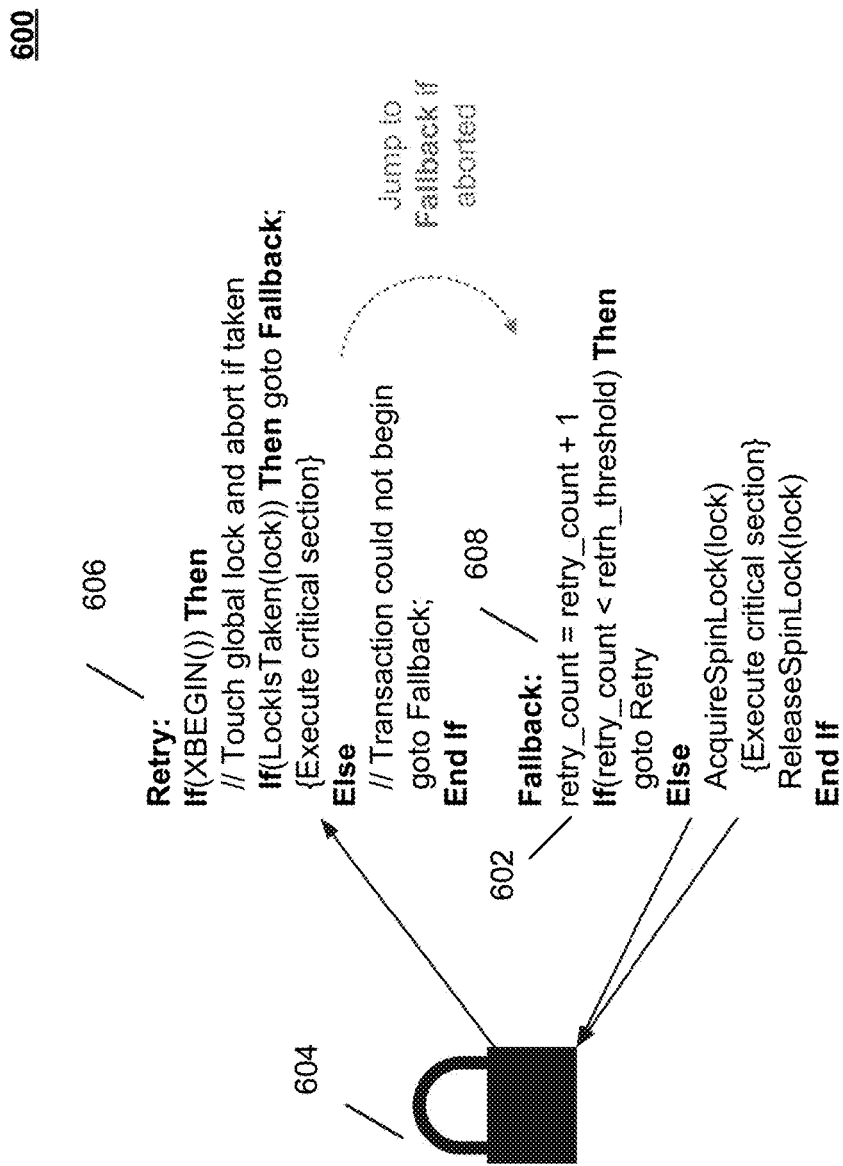
FIG. 6 illustrates an example technique for performing lock-elision with retry.

An example technique for mitigating the lemming effect involves having transactions retry more than once before falling back to acquire a lock. Retrying a contentious transaction may be costly, but the cost of acquiring the lock and serializing execution may be even less advantageous. In contrast to HLE, example RTM instructions may provide a flexible interface that allows custom code to be executed when a transaction aborts. As an optimization, RTM may be used to retry transactional execution of a critical section multiple times before resorting to acquiring the lock. FIG. 6 provides a schematic 600 illustrating an example technique for performing lock-elision with retry using the example RTM instructions. For example, FIG. 6 depicts an example lock elision technique using RTM with a configurable retry threshold 602. As shown in FIG. 6, a lock 604 is utilized for executing a critical section. For example, in a retry section

606, if the lock 604 is already taken, or if an abort occurs, a fallback section 608 is executed for handling a critical section.

Experimental results of a comparison of performance as workload skew and per-transaction optimistic attempt count are varied are discussed below. For experimental purposes, the B-Tree is pre-populated with 4 million items of 8-byte keys and payloads; 8 threads execute a workload with 50% lookups and 50% updates. The workload is Zipfian distributed with a skew parameter (θ) varied between 0 to 3 (uniform random through extremely high skew), and the number of transactional attempts per transaction is varied from 0 to 64, where 0 corresponds to synchronization with a spin-lock. A retry count of 1 exhibits performance that corresponds to an example default lock-elision implementation (e.g., HLE). The performance metric is throughput normalized to the throughput of a spin-lock.

The results indicated that as workload skew increases the performance of lock-elision drops substantially. At some point lock-elision performs less advantageously than spin-locks, achieving no parallelism from the multi-core hardware. Increasing the number of transactional attempts delays the performance cliff, and leads to a more graceful degradation of performance as skew increases.

Moving to larger retry limits indefinitely may not work in general; retrying doomed transactions has a cost and blindly retrying transactions may lead to performance that is less advantageous than serialized execution with a spinlock. The root of the issue is that with the existing HTM conflict resolution strategies (seemingly "attacker-wins") transactions may continuously abort one another without any guarantee of global progress. The result is that for a set of concurrent transactions, it may be possible that none of them commit: a result less advantageous than using a spinlock.

One factor that contributes to this issue is the position of the first conflicting access within transactions. In the previous experiment, conflicting accesses occur when the 8-byte payload is updated at the end of a tree traversal operation, which is late within the transaction. If the size of a payload is significantly larger than 8 bytes, updating it may become a longer operation, which shifts the first conflicting access earlier within the transaction. This may increase the probability that retries will repeatedly interfere with one another. For example, a thread $T_1$ may transactionally find a value in a tree and update its payload in place. In the meantime, a thread $T_2$ may attempt an update of the same payload, aborting $T_1$. While $T_2$ is still updating the payload, $T_1$ may have restarted; if updating the payload takes a long time compared to index search, then $T_1$ may cause an abort of $T_2$'s transaction. Even with only these two threads there is no guarantee the update will ever be completed.

The experiment discussed above was re-run with 256-byte (instead of 8-byte) payloads. Results indicated that as the number of transactional attempts increases, the performance reaches a peak and then drops (even below serialized performance). The optimal number of transactional attempts may depend on workloads and may vary substantially. In absence of a solution that chooses the number of transactional attempts dynamically depending on the workload, for future experiments the number of retry attempts was fixed to 8, which provided advantageous general performance and avoided collapse under realistic skews.

A single global lock may suffice when HTM is used for concurrency, but it may be problematic without HTM. Instead, practical high-concurrency, high-performance B-Trees rely on fine-grained locking techniques. Efficient fine-grained locking on B-Trees is not easily obtained correctly. Many techniques exist, but lock-coupling is a widely used approach (see, e.g., GRAEFE, GOETZ, "A Survey of B-tree Locking Techniques," In *Journal of ACM Transactions on Database Systems*, Vol. 35, Issue 3, July, 2010, and SRINIVASAN, et al., "Performance of B+Tree Concurrency Algorithms," In *International Journal on Very Large Data Bases*, Vol. 2, Issue 4, October, 1993).

In lock-coupling a pair of locks are held as a worker traverses pages: one on a "source" page and another on a "target" page. As the traversal proceeds, a lock on the target page in the traversal is first acquired and only afterward the lock on the source page is released. This ordering avoids races between reading the source page and accessing the target page (e.g., this may prevent a target page from disappearing as a traversal moves to it).

Lock-coupling may also be applied to parallelize B-Trees using HTM, with the potential of improving both capacity and conflict aborts. For example, transactions may maintain a smaller, constant-sized read set as they traverse down the tree, and they may avoid conflicts on higher levels of the tree as they work downward. Significantly, these constant-sized read sets may effectively eliminate the effect of tree size on abort rates.

However, an example HTM interface may be too restrictive to support lock-coupling. For example, HTM transactions on a single thread may be nested but may not be overlapped as lock-coupling's non-two-phase pattern involves. To make this work, TSX would need to give threads control over their read set. For example, AMD's proposed ASF instruction set (see, e.g., CHUNG, et al., "ASF: AMD64 Extension for Lock-Free Data Structures and Transactional Memory," In *Proceedings of the 43rd Annual IEEE/ACM International Symposium on Microarchitecture*, Dec. 4, 2010) includes a "release" instruction that removes a specified item from the read set of the executing transaction. Without such support, lock-coupling with an elided page lock may perform no more advantageously under the example HTM than using a single elided global lock.

Using lock elision (e.g., via HLE or RTM) may operate advantageously for simple B-tree indexes with predictable cache footprints. However, abort rates are sensitive to many parameters some of which may not be known until runtime; data structure size, access skew, access rate, physical address patterns, and false sharing may all play a role. Further, in some cases, using HTM as a global locking approach may result in less advantageous performance than single-threaded execution (or serialized execution with a spin lock) due to wasted work on aborts and transaction initialization overheads. Additionally, existing commodity HTM interfaces may be incompatible with fine-grained locking techniques such as lock-coupling, which may otherwise reduce conflicts and eliminate the dependency between aborts and data structure size.

In comparing HTM with a concept of hardware-accelerated lock-free programming, the approaches are different and each makes tradeoffs. For example, HTM provides an atomic update-in-place abstraction; lock-free programming techniques may use limited (often single word) atomic updates in place and may compose larger operations using copy-on-write. Thus, each approach is accompanied by a different set of costs and potential issues.

Because the two approaches perform updates differently, notable potential performance differences between them are due to the impact updates have on concurrent operations, specifically, how writes impact concurrent reads.

TABLE 2

|  | Read-Write Conflict | Write-Write Conflict |
| --- | --- | --- |
| HTM (Atomic update-in-place) | Abort/retry | Abort/retry |
| Lock-free (Copy-on-write and publish) | OK | Retry |

As illustrated in Table 2, HTM aborts whenever a read cacheline is concurrently modified, but lock-free techniques generally do not interfere with readers.

For example, as shown in Table 2, write-write conflicts cause retries and wasted work under both approaches; however, lock-free techniques avoid wasted work under read-write conflicts that HTM may not. For example, by avoiding update-in-place, lock-free updates via pointer publishing do not disrupt reads. Old values remain intact for concurrent reads while later reads find new version(s).

Figure 7:
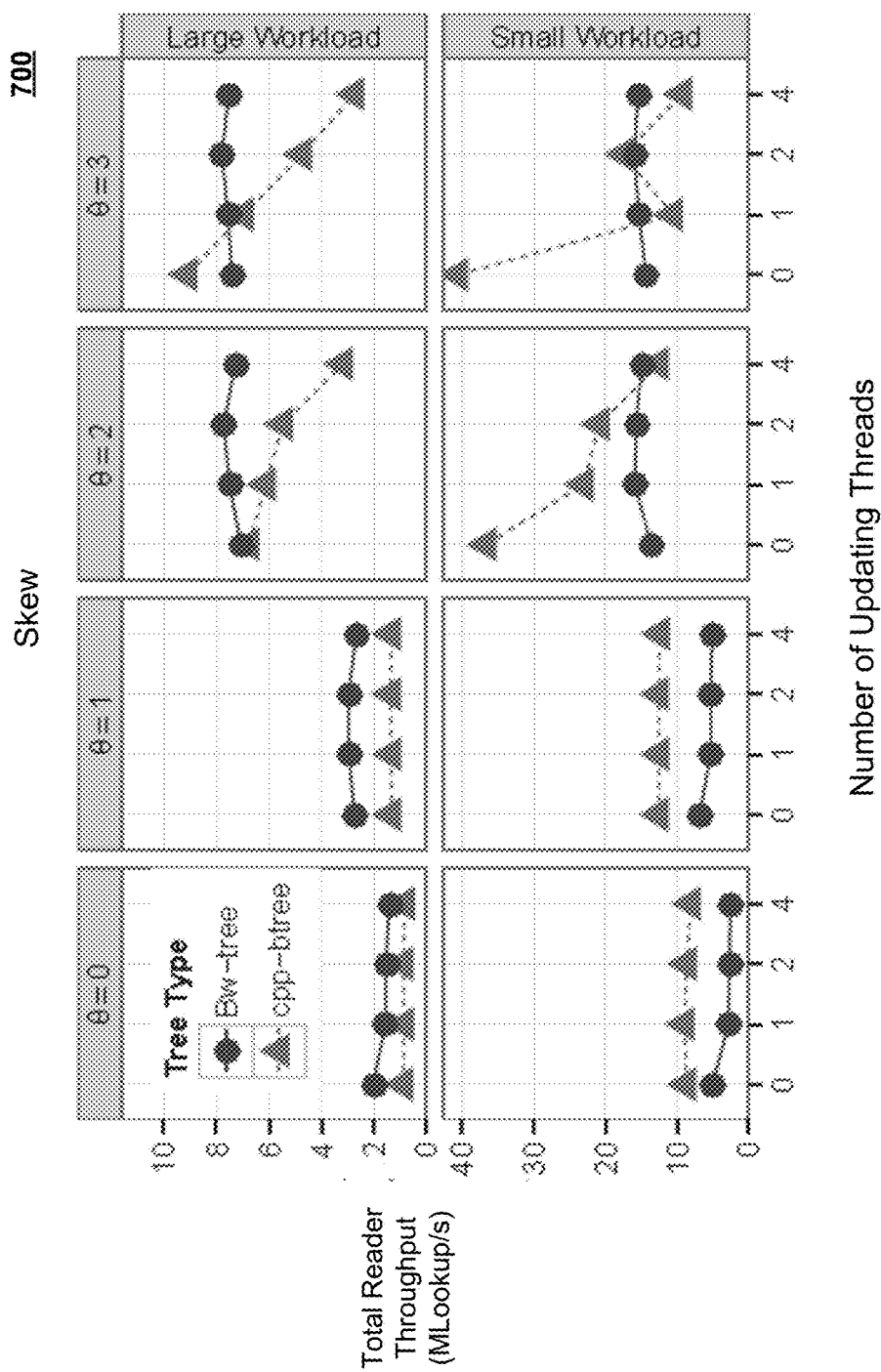
FIG. 7 illustrates an impact of concurrent writers on readers for two different types of B-Trees.

FIG. 7 explores this effect, illustrating the total read throughput for four reader threads with both B-Tree implementations as the number of threads performing updates and workload skew is varied. In this experiment, each tree includes 4 million records. FIG. 7 illustrates an impact of concurrent writers on readers for two different types of B-Trees. As illustrated in FIG. 7, reader performance may suffer under concurrent updates with the RTM-based CPP-BTREE, whereas readers are immune to updates with the lock-free BW-tree.

The small workload uses 8 byte keys and 8 byte payloads; the large workload uses 30 to 70 byte variable length keys and 256 byte payloads. For example, keys may be chosen according to a ZIPFIAN distribution (see, e.g., GRAY, et al., "Quickly Generating Billion-record Synthetic Databases," In *Proceedings of ACM SIGMOD Record*, Vol. 23, Issue 2, June, 1994).

For low contention workloads ($\theta=0$, which is a uniform random access pattern) neither the HTM-enabled CPP-BTREE nor the lock-free BW-tree may be significantly impacted by the presence of threads performing writes. However, for high contention workloads ($\theta \geq 2$) the reader throughput that the CPP-BTREE can sustain begins to drop. The BW-tree, in contrast, receives a double benefit from the contentious write heavy workloads. First, readers benefit from high access locality, since writers do not cause harm to readers. Second, writers may benefit readers: readers can read recent writes from cache (in addition to the benefit the locality skew gives).

Lock-free techniques can reduce the impact of concurrent writers on readers; however, this benefit comes with potential costs, such as a potential need for a garbage-collection-like mechanism for memory safety, a potential need for indirection for atomic updates, and a potential cost of copy-on-write. These costs are intertwined: tradeoffs for each influence the cost of the others.

Each object unlinked from a lock-free structure may continue to be accessed by threads that hold references to it. This is an advantageous benefit; however, for safety, the system may track when threads no longer hold references to an unlinked object. Otherwise, prematurely reusing an object's memory may result in threads reading corrupted data.

For example, the BW-tree uses an epoch mechanism (see, e.g., LEVANDOSKI, et al., "The Bw-Tree: A B-tree for New Hardware Platforms," In *Proceedings of 29th IEEE International Conference on Data Engineering* (ICDE 2013), Apr. 8-11, 2013, pp. 302-313) that tracks when each thread is accessing the tree. For example, threads may place themselves on a list for the current epoch whenever they access the tree, and they may only remove themselves after they drop all references to tree internal objects. For example, when a page is unlinked it may be placed on a queue in the current epoch until all threads have moved on to later epochs; after this point, the page may be safe for reuse and may be freed.

Different schemes for providing this "pointer stability" have different performance tradeoffs, but all may add potential overhead and many non-trivial lock-free data structures utilize some such mechanism. Example overhead incurred in the BW-tree due to epochs for the "large workload" discussed above with skew $\theta=3$ may involve cores spending 8% and 18% of their cycles on epoch protection for lookups and updates, respectively. All measurements of the BW-tree discussed herein include the overhead of its epoch protection.

Many lock-free structures also include another potential cost: lock-freedom may influence the in-memory layout of structures. For example, lock-free data structures may be designed to group together updates that need to be atomic, which may then be published via a single compare-and-swap, via a pointer-like field. For example, this may fuse synchronization and memory layout, and may force additional indirection. The BW-tree's mapping table is an example of this; each page access goes through indirection via the mapping table, which may effectively double the number of cachelines accessed when traversing the tree. In experiences with the BW-tree and more recent work on a lock-free transactional engine (see, e.g., LEVANDOSKI, et al., "High Performance Transactions in Deuteronomy," In *Proceedings of Seventh Biennial Conference on Innovative Data Systems Research*, Jan. 4, 2015), it has been experienced that this indirection is not burdensome; it may often coincide with variable-length lists or data, which may make efficient handling of indirection desirable.

This additional indirection may also burden memory allocators, since updates may not use the memory locations of the old values. Thus, specialized and/or lock-free memory allocators may be used to compensate for this.

Further, lock-free structures may also incur a cost of additional copying involved when using paged copy-on-write semantics. Example costs of copy-on-write may involve page size, access skew, the uniformity of payload sizes, and the cost of allocation—all of which may play a role in the effectiveness of copy-on-write. For example, for efficiency, data structures may amortize the cost of each full page copy over several lookups and updates.

For example, copy-on-write may improve performance in some cases. For example, copy-on-write may advantageously improve the performance of lookups that are concurrent with updates, and BW-tree's delta updates and blind writes may advantageously improve the performance of writers as well.

As discussed above, there may be advantageous performance benefits to lock-free indexing designs. However, the gains may involve costs, as it may be difficult to architect and build a complex lock-free data structure such as a B+-tree. The discussion below is generally directed to a middle ground that uses HTM to ease the difficulty of building lock-free indexes without substantially sacrificing performance. A first part of the discussion is directed to potential difficulties in lock-free indexing design, followed by a discussion of approaches for using HTM to implement a multi-word compare-and-swap (MWCAS) for use, e.g., within the BW-tree to atomically install multi-page structure modifications (e.g., split and merge). While the BW-tree may be discussed specifically below, the approach applies more generally (at least) to data structures that use indirection for lock freedom.

An example of a potential issue encountered with lock-free index designs stems from reliance on atomic CPU primitives—for example, CAS or fetch-and-increment operations—to make state changes to the data structure (e.g., to transform the data structure from a current state to an updated, transformed state). These example instructions function at the granularity of a single word (e.g., generally a 64-bit word on current CPU architectures). Thus, designing the data structure may rely on these features if all operations on the data structure require only a single atomic instruction. However, this may not be the case for non-trivial data structures. For example, difficulties may arise when operations must span multiple atomic operations.

For example, in the BW-tree, structure modification operations (SMOs) such as page splits and merges span multiple atomic steps. For example, splits involve two atomic steps, each installed using a CAS: one to install the split to an existing page P with a new sibling R, and another to install the new search key and logical page pointer to sibling R at a parent page R. For example, page merges may involve three steps: one to mark a page P as deleted, a second to update P's sibling Q to merge any of P's existing keys, and a third to delete P's ID and search key from the parent O. Example techniques discussed herein may be used to provide atomicity (all or nothing) for structure modifications (e.g., SMOs).

When operations span multiple atomic steps, one potential issue that may arise is handling the case when other threads observe the operation "in progress". In lock-based designs, safety in such situations may be guaranteed by a thread stalling on a lock set by a thread performing an SMO (see, e.g., SRINIVASAN, et al., "Performance of B+Tree Concurrency Algorithms," In *International Journal on Very Large Data Bases*, Vol. 2, Issue 4, October, 1993). In lock-free scenarios this process may involve more handling effort: for example, a system may handle both (a) how to detect such conflicts without locks and (b) what to do after detecting the conflict without blocking nor corrupting data. For example, the example BW-tree design may address these issues as discussed below.

For example, a worker may detect an in-progress split by determining (detecting) that a page's boundary keys do not include the search key; an in-progress delete may be detected by traversing to a page that includes a "page delete" delta record. For example, if any BW-tree thread encounters an in-progress SMO, it helps along to complete the SMO before completing its own operation. This example "help-along" protocol may be used in many lock-free designs for performance, to guarantee progress, and correctness (e.g., to serialize SMOs that "run into" each other (see, e.g., LEVANDOSKI, et al., "The Bw-Tree: A B-tree for New Hardware Platforms," In *Proceedings of 29th IEEE International Conference on Data Engineering* (ICDE 2013), Apr. 8-11, 2013, pp. 302-313)). An example alternate strategy may involve having a thread simply retry upon encountering an SMO (e.g., a form of spinning to wait for the SMO). However, in this case the wait may be extensive: the SMO thread may be scheduled out by the operating system (OS), or "lose its way" in the tree and may need to reposition itself to finish the SMO (e.g., when going up to the parent and finding it split). For example, the "help-along" protocol may ensure (e.g., guarantee) that an SMO completes in a timely manner.

Lock-free designs may also involve subtle race conditions that may involve potential issues in reasoning about them, engineering around them, and debugging them. For example, when utilizing a BW-tree, substantially simultaneous splits and merges on the same page may collide at the parent, and, without handling, may lead to index corruption. For example, this may occur when a thread ti sees an in-progress split of a page P into P' and R and attempts to help along by installing the new index term for R at the parent O. In the meantime, another thread $t_2$ may have deleted R and already removed its entry at O (which may have been installed by another thread $t_3$). In this case ti may need to be able to detect the fact that R was deleted and avoid modifying O. Thus, it may be generally desirable to include a correct page delete protocol for use in the BW-tree. There may be other races and issues encountered when building structures such as the BW-tree, but this single example provides insight on potential type of issues that may be encountered when building lock-free infrastructure.

In the discussion below, one goal may be to ease potential issues of building lock-free data structures. Example techniques are discussed that use HTM, e.g., to simplify lock-free designs by building a high performance multi-word compare and swap to compose operations that may otherwise involve a series of multiple atomic steps.

As discussed herein, an example issue that may arise for the BW-tree lock-free design is handling operations that span multiple atomic operations on arbitrary locations in the indirection mapping table. As discussed herein, an ability to perform an atomic multi-word compare-and-swap (MW-CAS) on arbitrary memory locations may help to simplify the design and implementation (at least) of the BW-tree. In accordance with example techniques discussed herein, the HTM may be utilized to atomically update arbitrary words.

Using HTM to implement an MWCAS may be advantageous for many current HTM implementations, as many applications may only need an MWCAS to span a small number of words. For example, the BW-tree may need at most a triple-word MWCAS to install a page delete, and thus MWCAS transactions may not suffer aborts due to capacity constraints even with current potentially stringent HTM limits. Further, MWCAS transactions may be short-lived (e.g., involving only a load, compare, and store for each word) and may avoid interrupts that may spuriously abort longer running transactions (see, e.g., LEIS, et al., "Exploiting Hardware Transactional Memory in Main-Memory Databases," In *Proceedings of the 30th IEEE International Conference on Data Engineering*, Mar, 31, 2014).

For example, one approach may place a global elided lock over the BW-tree indirection mapping table. To implement the global lock, the RTM-based approach discussed above may be used, as it may perform advantageously over a default HLE. For example, if a thread cannot make progress after its retry threshold, it may acquire the global exclusive lock and execute the critical section in isolation. A discussion of this approach is provided below.

Figure 8:
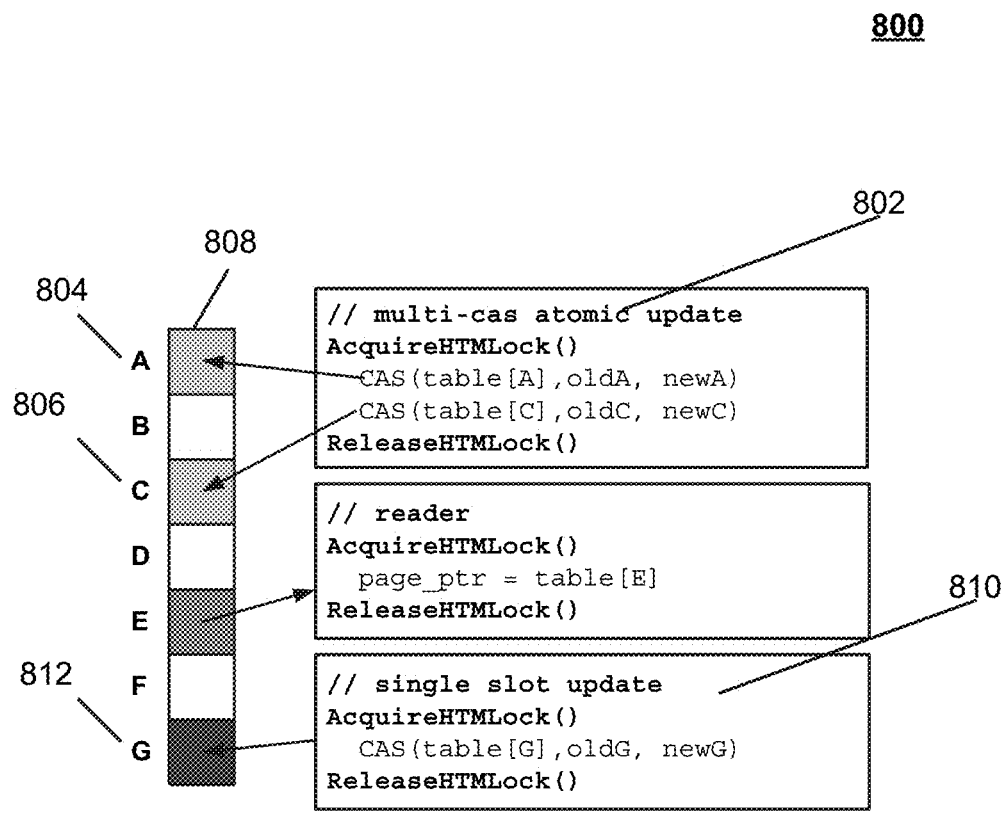
FIG. 8 depicts an example multi-slot update to pages in a mapping table.

For example, writes to the mapping table may bracket one or more compare and swaps within the acquisition and release of the HTM lock. FIG. 8 illustrates a global HTM lock protecting an example page indirection mapping table. As shown in the example of FIG. 8, all reads and writes elide the lock before accessing the table.

FIG. 8 depicts an example multi-slot update 802 to pages A 804 and C 806 in the mapping table 808, along with another example thread updating 810 a single page G 812. For example, executing each CAS under the HTM lock may ensure that if a conflict is detected, all changes to the mapping table may be rolled back; the transaction may eventually succeed on a retry (possibly acquiring the global lock if needed). For example, to avoid potential spurious aborts, all page data may be allocated and prepared outside of the MWCAS operation to avoid HTM aborts, e.g., due to shared access to the allocator or accessing random shared cache lines. For example, a thread installing a split in the BW-tree may allocate and prepare both the split delta and the index term delta for the parent before performing the MWCAS to install its two changes to the mapping table.

As another example, index traversals may be bracketed. For example, multiple reads within a transaction representing an index traversal from root to leaf may be bracketed. This example technique may completely isolate index traversals from encountering in-progress SMOs. However, the example technique may increase the abort rate, since the transaction may include logic to access page memory and perform binary search on internal index nodes. As discussed above, success rates for transactions at such a coarse grain may depend on independent factors (e.g., page size, key size).

As another example, singleton read transactions may be utilized. For example, each read of a single 8-byte mapping table word may be placed in its own transaction, which may avoid aborts due to cache capacity, since transactions may only include a single read. However, readers may encounter an "in-progress" SMO operation, for example, when a split is installed between the time a reader accesses the "old" parent (without the split applied) and the "new" child (with the split applied). While such example cases may need detection, code to handle such cases may seem simpler to determine: for example, the traversal may be retried from a valid ancestor node. This example technique may ensure for the reader that the MWCAS writes are atomic, and thus SMOs are installed atomically. Therefore, readers may not need to worry about complex situations such as helping along to complete an SMO, what to do when running into multiple in-progress SMOs that collide, etc.

As another example, non-transactional reads may be utilized. For example, all reads may be performed non-transactionally. Thus, for example, readers may advantageously avoid setup and teardown time for hardware transactions. However, readers may not be not guaranteed that they will see SMOs installed atomically, for example, when a reader observes writes from a transaction executing within its locked fall-back path. For example, the reader may observe an index state where the writer is "in between" mapping table writes; this may not occur if a read were done inside a transaction or while holding the fallback lock. One possible result is little to no reduction in code complexity, since non-transactional accesses may need to be prepared to help along to complete an SMO (or spin waiting for it to finish). Another potential issue is that the writer may need to order its store operations in its fallback path with care, since non-transactional reads will see these stores in the order in which they occur. While this may not present issues for lock-free structures (e.g., the BW-tree) that already order SMO writes with care, it may involve some issues in some general cases.

As another example, both singleton reads and writes may be removed from HTM transactions, which may be referred to herein as an example "infinite retry" technique. For example, this technique may advantageously utilize an example property of singleton reads or updates (that are non-transactional), that they may still trigger the cache coherence protocol for their target cache lines. For example, since HTM transactions may piggyback off this protocol, the multi-word CAS running within the transaction will see the changes to its write set. Unlike the non-transactional read technique discussed above, this example technique may maintain the property that readers see atomic installation of MWCAS writes.

Further discussed herein are example techniques to help guarantee progress of the transactional writes, in order to avoid spurious aborts as well as starvation due to continued data conflict with singleton (non-transactional) reads and writes.

Figure 9:
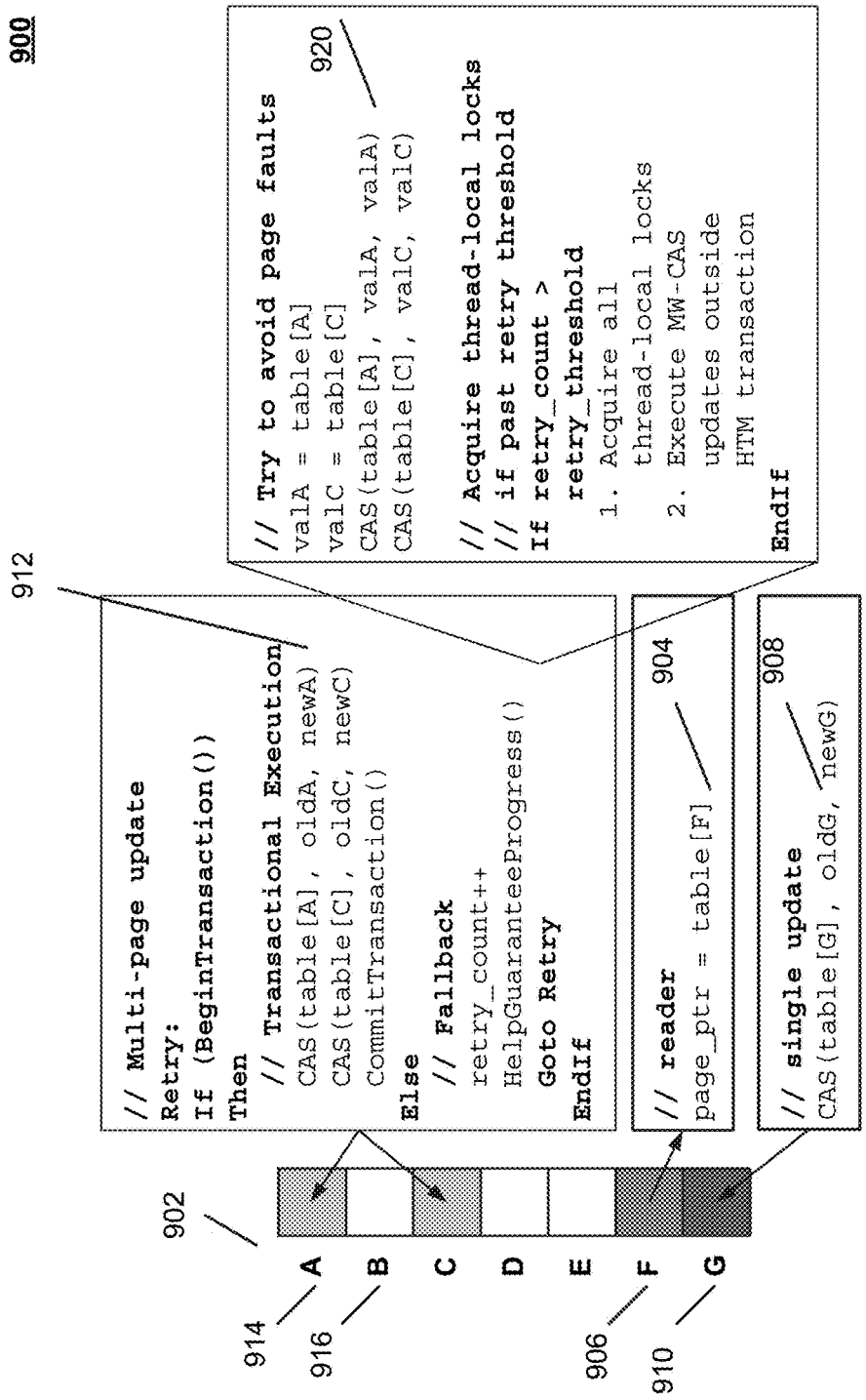
FIG. 9 illustrates an example technique for utilizing MWCAS updates to a mapping table.

FIG. 9 illustrates an example technique (e.g., in the left-hand side of the figure) for MWCAS updates to a mapping table 902. As shown in FIG. 9, singleton mapping table reads and updates may not operate within an HTM transaction, as depicted by the reader 904 to slot F 906 and an update 908 to slot G 910. As shown in the example, only multi-slot updates (e.g., a multi-slot update 912 to A 914 and C 916) operate within a hardware transaction and execute the MWCAS 912. In this example, the MWCAS 912 may abort if conflicting with a singleton read or update, detecting the conflict through the cache coherence protocol. The MWCAS 912 may continuously retry the transaction in this case. Effectively, for this example, this may place the MWCAS 912 at a lower priority compared to the singleton reads/updates, since they can abort the MWCAS transaction, but not vice versa.

The MWCAS 912 may not fall back on a single elided lock protecting the mapping table since the singleton reads/updates are not aware of the lock. For example, this may be resolved by allowing the transaction to fail after it has retried a predetermined (e.g., configurable) number of times; for the BW-tree this may involve, effectively, abandoning an SMO, which may eventually be retried later by another thread (at which time it may succeed). However, if progress is necessary, the MWCAS 912 may retry an "infinite" number of times until the transaction succeeds (thus the name of the approach). Thus, the MWCAS 912 may experience starvation; however this may be true generally for all lock-free data structures.

However, infinitely retrying a transaction may not guarantee that an MWCAS will succeed, since there may not be a guarantee that a hardware transaction will ever succeed (whereas, e.g., for a single-word CAS, there may always be a winner). Example techniques are discussed below for helping to guarantee progress of this approach while trying to avoid a single elided lock. For example, the right hand side of FIG. 9 illustrates examples involving these approaches.

For example, since an MWCAS transaction may be substantially short and may touch a substantially small number of cache lines, it may avoid a likelihood of spurious aborts due to capacity constraints or interrupts due to substantially long-running transactions. However, these may not be the only reasons for aborts with an example HTM implementation.

For example, memory page faults may be avoided, in accordance with an example technique discussed below. When a transaction encounters a page fault, it may abort. Further, speculative transactional execution may suppress the page fault event, so that retrying the transaction speculatively may always fail without some outside help. For example, an HTM designer may indicate that synchronous exception events, including page faults, "are suppressed as if they had never occurred" (see, e.g., "INTEL 64 and IA-32 Architectures Optimization Reference Manual," September 2014). For example, running a single transaction that performs a single access to a not-present page may always abort if a fallback lock is not used—the OS may not receive the page fault event.

As a result, when omitting a fallback lock, a fallback code path may need to (at least) pre-fault the addresses that the transaction intends to access. Generally, the mapping table may be present in memory, but the correctness and progress of the system may not need to depend on it. The right hand side of FIG. 9 illustrates an example technique for "safely" inducing the page faults. For example, on the fallback path, the MWCAS 912 may read its target words (in this case mapping table slots A 914 and C 916) and may perform a CAS for each of these words (920) to assign the target word the same value as was just read. For example, the CAS may induce any page faults while ensuring that the same value is stored back to the memory location. For example, using a simple store might lead to incorrect values being stored back in mapping table slots under concurrent operations, and using a simple load might leave the page in a shared, copy-on-write state (for example, if the page was a fresh "zero page"). After executing this fallback path, the MWCAS 912 may then retry its updates.

As another example, thread local read/write locks may be utilized. For example, if a processor designer does not guarantee that hardware transactions commit, avoiding page faults even for short transactions may not guarantee progress. For example, two transactions with overlapping read/write sets may collide and continuously abort on data conflicts. Thus, for example, an example "stop the world" technique may be utilized to potentially guarantee the MWCAS can make progress by giving it exclusive access to update its target words non-transactionally. For example, exclusivity may be achieved while avoiding a global shared lock by assigning a thread-local read/write lock to each thread, as depicted on the right-hand side of FIG. 9. This example technique, which may be referred to herein as "lockaside" (see, e.g., CALCIU et al., "NUMA-Aware Reader-Writer Locks," In 18*th ACM SIGPLAN Symposium on Principles and Practice of Parallel Programming* (PPoPP'13), Feb. 23-27, 2013), maintains a read/write lock for each thread (e.g., respective locks that may be "local" to each respective thread—i.e., "thread local" read/write locks). For example, before starting an operation, a thread may acquire exclusive access to its own lock. After an MWCAS has retried a number of times (e.g., a predetermined, or configurable number of times) with no progress, it may attempt to gain exclusive access to the mapping table by acquiring all locks from other threads in the set (e.g., in a deterministic order); for example, this may be the only time a lock is modified by another thread. Once the MWCAS acquires all such locks, it may modify its mapping table entries and may then release all locks.

For example, a lockaside table may be implemented as an array of cache-line sized entries, where each entry is assigned to a thread executing reads or updates against the index. For example, a deterministic technique for to acquiring all locks may include starting from a first ($0^{th}$) index in the lock array, acquiring locks in the index in monotonically increasing order until all locks are acquired. This example deterministic order may avoid what is commonly referred to as "deadlocks."

In many cases, this example technique may be advantageously efficient, since thread-local lock acquisition involves modifying a word already in CPU cache on the thread's local socket, thus avoiding "ping-ponging" across sockets (or cores). For example, scalability for lock acquisition (and release) may be an issue on substantially large many-core machines (e.g., a XEON PHI of INTEL). For current processors with HTM (currently single-socket), lock count may be less of an issue, particularly if the number of threads equals the number of cores (which may generally hold, if using a memory-only non-blocking data structure).

Figure 10:
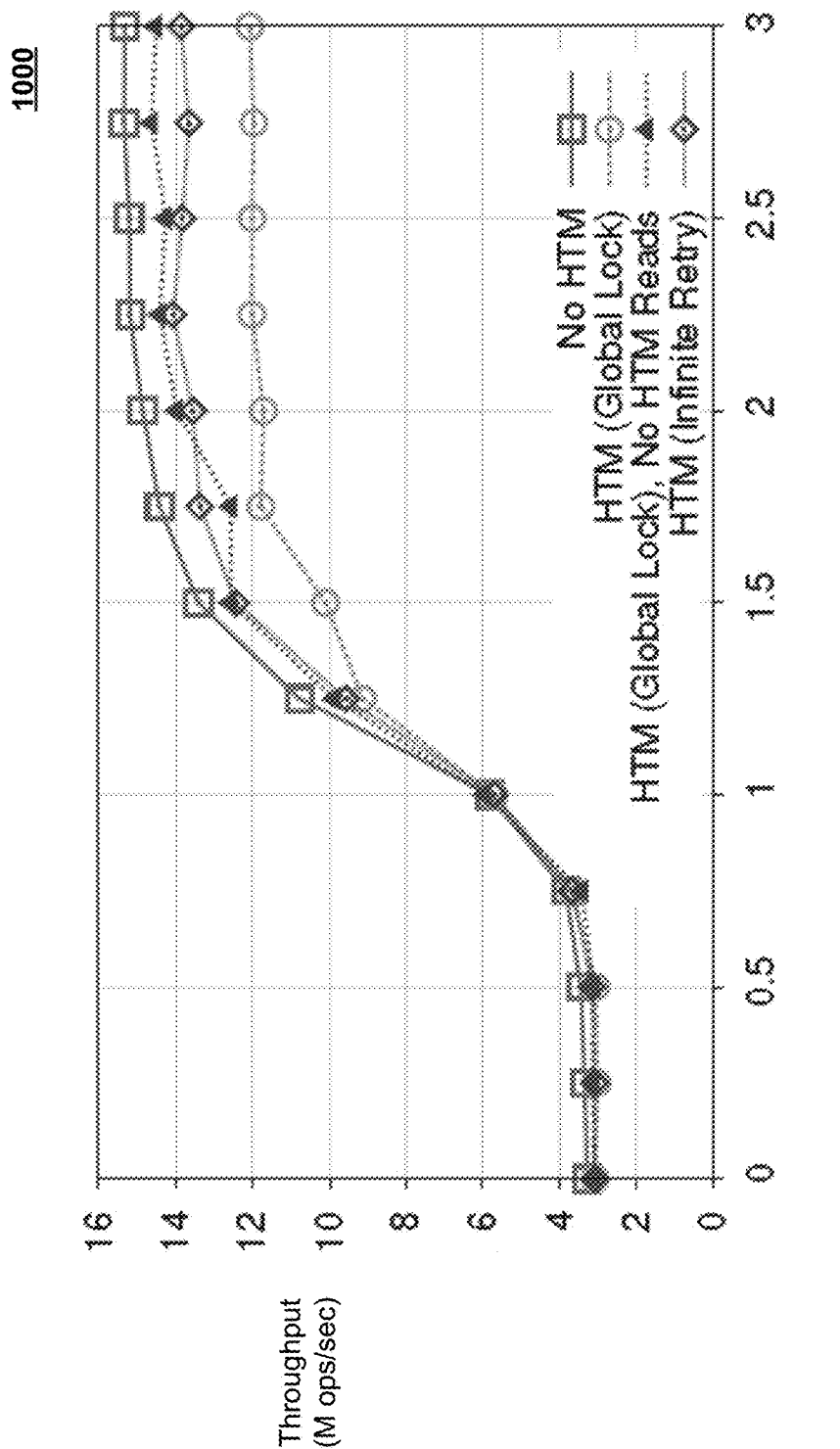
FIG. 10 depicts example performance of two MW-CAS global lock and infinite retry techniques compared to an example baseline lock-free performance.

FIG. 10 depicts example performance of two MW-CAS global lock and infinite retry techniques compared to an example baseline lock-free performance.

FIG. 10 illustrates example results of an experimental evaluation of a pure lock-free BW-tree implementation (abbreviated in the figure as "No HTM") along with example MWCAS techniques as discussed above. For this experimental evaluation, the experimental workload includes 4 update threads and 4 read threads, where each thread selects the next record to update/read at random from a range of 10M keys using a Zipf distribution. As illustrated in FIG. 10, total throughput (y-axis) is plotted for various Zipf skew parameters (x-axis). Numbers for the example technique that bracket entire tree traversals in a transaction are omitted, since its performance (due to aborts) may not closely approximate the other alternatives. Using the global elided lock to bracket all operations (including singleton reads, and abbreviated in the figure as "Global Lock") is not difficult to implement. However, performance may degrade by up to 25% due to the additional overhead of transaction setup and teardown (e.g., roughly 65 cycles on the experiment machine discussed herein). Removing reads from the global elided lock (abbreviated in the figure as "No HTM Reads") may result in performance within 10% of "No HTM." However, this may occur at the cost of no reduction in code complexity, as mentioned above. The example "Infinite Retry" technique may also exhibit similar performance to "No HTM Reads." Thus, for example, much of the overhead may be due to the write itself.

As discussed herein, HTM may provide substantially easy parallel access to substantially "simple" data structures. For example, for a moderately-sized index, small fixed-length key and payload sizes, HTM may enable advantageous thread scalability with little effort.

However, predicting HTM performance in indexes may be more difficult, and may substantially limit its usefulness. For example, many factors may influence concurrency (and, in turn, performance), some of which may vary at runtime. For example, predicting abort rates may combine the complexity of predicting page table walks, cache misses due to capacity and associativity (e.g., key and payload sizes in the index), application access patterns, and thread scheduling. Furthermore, the parameters for each of these variables may change with each new CPU:TLB coverage, cache configuration, core count, and hardware thread configuration may vary from generation to generation.

As discussed herein, a substantially simple and substantially predictable approach to leveraging HTM for main-memory indexing may involve a small primitive where the number of cache lines accessed are constant per transaction (e.g., rather than some function of data structure size or workload skew). For example, HTM may be used as a multi-word CAS, as discussed above. For example, many aborts in these transactions may be due to a data access conflict (e.g., rather than other spurious aborts) and the cost of retrying may be advantageously low enough that it may not perform less advantageously than a spin-lock technique, including cases involving "infinite retries."

As discussed above, BW-trees have numerous uses, and are currently used in a number of MICROSOFT products including the SQL SERVER HEKATON and AZURE DOCUMENTDB. Several designs are discussed herein, of a multi-word compare and swap (MWCAS) that use HTM to arbitrate conflict on multiple arbitrary cache lines. For example, the MWCAS (e.g., as an application of HTM) may avoid aborts since transactions may be small and short, may provide advantageous performance benefits, and may advantageously simplify lock-free data structure design.

II. Example Operating Environment

Features discussed herein are provided as example embodiments that may be implemented in many different ways that may be understood by one of skill in the art of computing, without departing from the spirit of the discussion herein. Such features are to be construed only as example embodiment features, and are not intended to be construed as limiting to only those detailed descriptions.

FIG. 11 illustrates an example of a suitable computing system environment 1100 on which aspects of the subject matter discussed herein may be implemented. The computing system environment 1100 is only one example of a suitable computing environment and is not intended to suggest any limitation as to the scope of use or functionality of aspects of the subject matter discussed herein. Neither should the computing environment 1100 be interpreted as having any dependency or requirement relating to any one or combination of components illustrated in the example operating environment 1100.

Aspects of the subject matter discussed herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 11, an example system for implementing aspects of the subject matter discussed herein includes a general-purpose computing device in the form of a computer 1110. A computer may include any electronic device that is capable of executing an instruction. Components of the computer 1110 may include a processing unit 1120, a system memory 1130, and one or more system buses (represented by system bus 1121) that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 1120 may be connected to a hardware security device 1122. The security device 1122 may store and be able to generate cryptographic keys that may be used to secure various aspects of the computer 1110. In one embodiment, the security device 1122 may comprise a Trusted Platform Module (TPM) chip, TPM Security Device, or the like.

The computer 1110 typically includes a variety of computer-readable media. Computer-readable media can be any available media that can be accessed by the computer 1110 and includes both volatile and nonvolatile media, and removable and non-removable media. By way of example, and not limitation, computer-readable media may comprise computer storage media and communication media.

Computer storage media (or "computer-readable storage media") includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs), Blu-ray Disc (BD) or other optical disk storage (e.g., Universal Serial Bus (USB) drive, hard disk drive), magnetic cassettes, magnetic tape, magnetic disk storage or other magnetic storage devices, or any other medium which can be used to store the desired information and which can be accessed by the computer 1110. "Computer storage media" does not include "communication media." Thus, as used herein, the term "computer-readable storage medium" is not a signal per se, nor any type of propagating signal per se.

"Communication media" typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 1130 may include computer storage media in the form of volatile and/or nonvolatile memory such as read only memory (ROM) 1131 and random access memory (RAM) 1132. Nonvolatile memory may be substituted for some or all of the ROM 1131 and/or the RAM 1132. For example, memristor memory, phase-change memory (PCM), or some other type of nonvolatile memory may be used instead of, or in addition to, the ROM 1131 and/or the RAM 1132. As shown in FIG. 11, a hardware transactional memory (HTM) 1138 may also be present for memory use.

A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disc drive 1155 that reads from or writes to a removable, nonvolatile optical disc 1156 such as a CD ROM, DVD, BD, or other optical media.

In one implementation, memristor memory, phase-change memory, or some other type of nonvolatile memory may be used instead of, or in addition to, the hard drive 1141.

Other removable/non-removable, volatile/nonvolatile computer storage media (or "computer-readable storage media") that can be used in the exemplary operating environment include magnetic tape cassettes, flash memory cards and other solid state storage devices, digital versatile discs, other optical discs, digital video tape, solid state RAM, solid state ROM, and the like. The hard disk drive 1141 may be connected to the system bus 1121 through the interface 140, and magnetic disk drive 1151 and optical disc drive 1155 may be connected to the system bus 1121 by an interface for removable nonvolatile memory such as the interface 1150.

The drives and their associated computer storage media, discussed above and illustrated in FIG. 11, provide storage of computer-readable instructions, data structures, program modules, and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers herein to illustrate that they may be different copies.

A user may enter commands and information into the computer 1110 through input devices such as a keyboard 1162 and pointing device 1161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 1120 through a user input interface 1160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include phone networks, near field networks, and other networks. Such networking environments are commonplace in offices, enterprise-wide computer networks, intranets, and the Internet.

When used in a LAN networking environment, the computer 110 is connected to the LAN 1171 through a network interface or adapter 1170. When used in a WAN networking environment, the computer 1110 may include a modem 1172 or other means for establishing communications over the WAN 1173, such as the Internet. The modem 1172, which may be internal or external, may be connected to the system bus 1121 via the user input interface 1160 or other appropriate mechanism. In a networked environment, program modules depicted relative to the computer 1110, or portions thereof, may be stored in the remote memory storage device. By way of example, and not limitation, FIG. 11 illustrates remote application programs 185 as residing on memory device 181. It will be appreciated that the network connections shown are exemplary and other means of establishing a communications link between the computers may be used.

In this context, a "processor" may include a single processor or multiple processors configured to process instructions associated with a computing system. A processor may thus include one or more processors executing instructions in parallel and/or in a distributed manner. For example, the system shown in FIG. 11 may include one or more processors (e.g., hardware processors).

For example, a system may include at least one hardware device processor, and a computer-readable storage medium storing executable instructions for execution by the device processor, for implementing a table state control module structured to control a transformation of a current state of one or more entries in a mapping table to an updated state of the entries in the mapping table in a latch-free manner by initiating an atomic multi-word compare-and-swap (MW-CAS) operation on a plurality of words using a hardware transactional memory (HTM) resident in the device processor. The MWCAS operation uses hardware primitive operations of the HTM, and the mapping table entries are associated with a lock-free index of a database.

For example, the table state control module may include one or more of the modules discussed above with regard to FIG. 11.

For example, the table state control module may be structured to control the transformation by bracketing accesses to the mapping table in a hardware transaction. For example, controlling the transformation may include bracketing an entire index traversal in a hardware transaction. For example, controlling the transformation may include bracketing only singleton read operations in a hardware transaction.

For example, controlling the transformation may include performing read operations non-transactionally.

For example, the table state control module may be structured to control the transformation by bracketing only multi-slot updates to the mapping table in hardware transactions.

For example, the table state control module may be structured to control the transformation by bracketing accesses to the mapping table in hardware transactions, and avoid memory page faults by executing a fallback code path.

For example, the table state control module may be structured to avoid the memory page faults by executing a fallback code path that pre-faults addresses to be executed by one or more of the hardware transactions.

For example, pre-faulting the addresses to be executed by the one or more of the hardware transactions may include executing an atomic MWCAS to read the values of respective target words and to perform a compare and swap (CAS) operation on each respective read word that assigns to each respective target word location, the read value of the respective each read word.

For example, the table state control module may be structured to retry executing the fallback code path that pre-faults addresses to be executed by one or more of the hardware transactions. For example, the retry of executing the fallback code path may be performed for a configurable number of retries.

For example, the table state control module may be structured to control the transformation by bracketing accesses to the mapping table in hardware transactions, and provide an atomic MWCAS with exclusive access to target words via lockaside operations.

For example, the table state control module may be structured to maintain a respective thread-local read/write lock for each thread of a plurality of concurrently executing threads, and before starting an operation by one of the threads, acquire exclusive access for the one of the threads, to the respective thread-local read/write lock for the one of the threads, wherein the lockaside operations include obtaining exclusive access to the mapping table by acquiring all respective thread-local read/write locks from other threads of the plurality of concurrently executing threads.

For example, obtaining the exclusive access to the mapping table may include acquiring all respective thread-local read/write locks from other threads of the plurality of concurrently executing threads, in a deterministic order.

For example, the table state control module may be structured to modify target mapping table entries, by the one of the threads, and release all the respective thread-local read/write locks from the other threads, after the modifying of the target mapping table entries.

For example, the table state control module may be structured to control a transformation of a first state of one or more entries in a mapping table to a second state of the entries in the mapping table that are associated with latch-free updates that are associated with a data structure that uses an indirection mapping table that includes the mapping table, the controlling including initiating an atomic multi-word compare-and-swap (MWCAS) operation on a plurality of words using a hardware transactional memory (HTM) resident in a device processor, the MWCAS operation performed using hardware primitive operations of the HTM, via the device processor.

For example, controlling the transformation may include controlling progress of hardware transactions that are not guaranteed to succeed, by bracketing accesses to the mapping table in hardware transactions, and by providing an atomic MWCAS with exclusive access to target words via lockaside operations.

For example, the table state control module may be structured to access a current state of one or more entries in a mapping table that are associated with latch-free updates of a data structure that uses an indirection mapping table for lock freedom, control a transformation of the current state of the one or more entries in the mapping table to a transformed state of the entries in the mapping table, the controlling including initiating an atomic multi-word compare-and-swap (MWCAS) operation on a plurality of words using a hardware transactional memory (HTM) resident in a device processor, the MWCAS operation performed using hardware primitive operations of the HTM, via the device processor, and control a transformation of a current state of the data structure to an updated state of the data structure, via the transformation of the current state of the one or more entries in the mapping table to the transformed state of the entries in the mapping table.

For example, controlling the transformation of the current state of the one or more entries in the mapping table may include bracketing accesses to the mapping table in a hardware transaction.

For example, bracketing accesses to the mapping table in the hardware transaction may include bracketing accesses for an entire index traversal in the hardware transaction.

One skilled in the art of computing will appreciate that many different techniques may be used for implementing features discussed herein.

III. Flowchart Description

Features discussed herein are provided as example embodiments that may be implemented in many different ways that may be understood by one of skill in the art of computing, without departing from the spirit of the discussion herein. Such features are to be construed only as example embodiment features, and are not intended to be construed as limiting to only those detailed descriptions.

FIG. 12 is a flowchart illustrating example operations of the system of FIG. 11, according to example embodiments. As shown in the example of FIG. 12, a transformation of a current state of one or more entries in a mapping table to an updated state of the entries in the mapping table is controlled in a latch-free manner by initiating an atomic multi-word compare-and-swap (MWCAS) operation on a plurality of words using a hardware transactional memory (HTM) resident in the device processor, the MWCAS operation using hardware primitive operations of the HTM, the one or more mapping table entries associated with a lock-free index of a database (1202).

For example, the transformation may be controlled by bracketing accesses to the mapping table in a hardware transaction.

For example, controlling the transformation includes bracketing an entire index traversal in a hardware transaction.

For example, controlling the transformation includes bracketing only singleton read operations in a hardware transaction.

For example, controlling the transformation includes performing read operations non-transactionally.

For example, the transformation may be controlled by bracketing only multi-slot updates to the mapping table in hardware transactions.

For example, the transformation may be controlled by bracketing accesses to the mapping table in hardware transactions. Memory page faults may be avoided by executing a fallback code path.

For example, memory page faults may be avoided by executing a fallback code path that pre-faults addresses to be executed by one or more of the hardware transactions.

For example, pre-faulting the addresses to be executed by the one or more of the hardware transactions includes executing an atomic MWCAS to read the values of respective target words and to perform a compare and swap (CAS) operation on each respective read word that assigns to each respective target word location, the read value of the respective each read word.

For example, execution of the fallback code path that pre-faults addresses to be executed by one or more of the hardware transactions may be retried.

For example, the retry of executing the fallback code path is performed for a configurable number of retries.

For example, the transformation may be controlled by bracketing accesses to the mapping table in hardware transactions. For example, an atomic MWCAS may be provided with exclusive access to target words via lockaside operations.

For example, maintain a respective thread-local read/write lock for each thread of a plurality of concurrently executing threads may be maintained, and before starting an operation by one of the threads, exclusive access for the one of the threads, to the respective thread-local read/write lock for the one of the threads, may be acquired. The lockaside operations include obtaining exclusive access to the mapping table by acquiring all respective thread-local read/write locks from other threads of the plurality of concurrently executing threads.

For example, obtaining the exclusive access to the mapping table includes acquiring all respective thread-local read/write locks from other threads of the plurality of concurrently executing threads, in a deterministic order.

For example, target mapping table entries may be modified, by the one of the threads, and all the respective thread-local read/write locks from the other threads may be released, after the modifying of the target mapping table entries.

Figure 13:
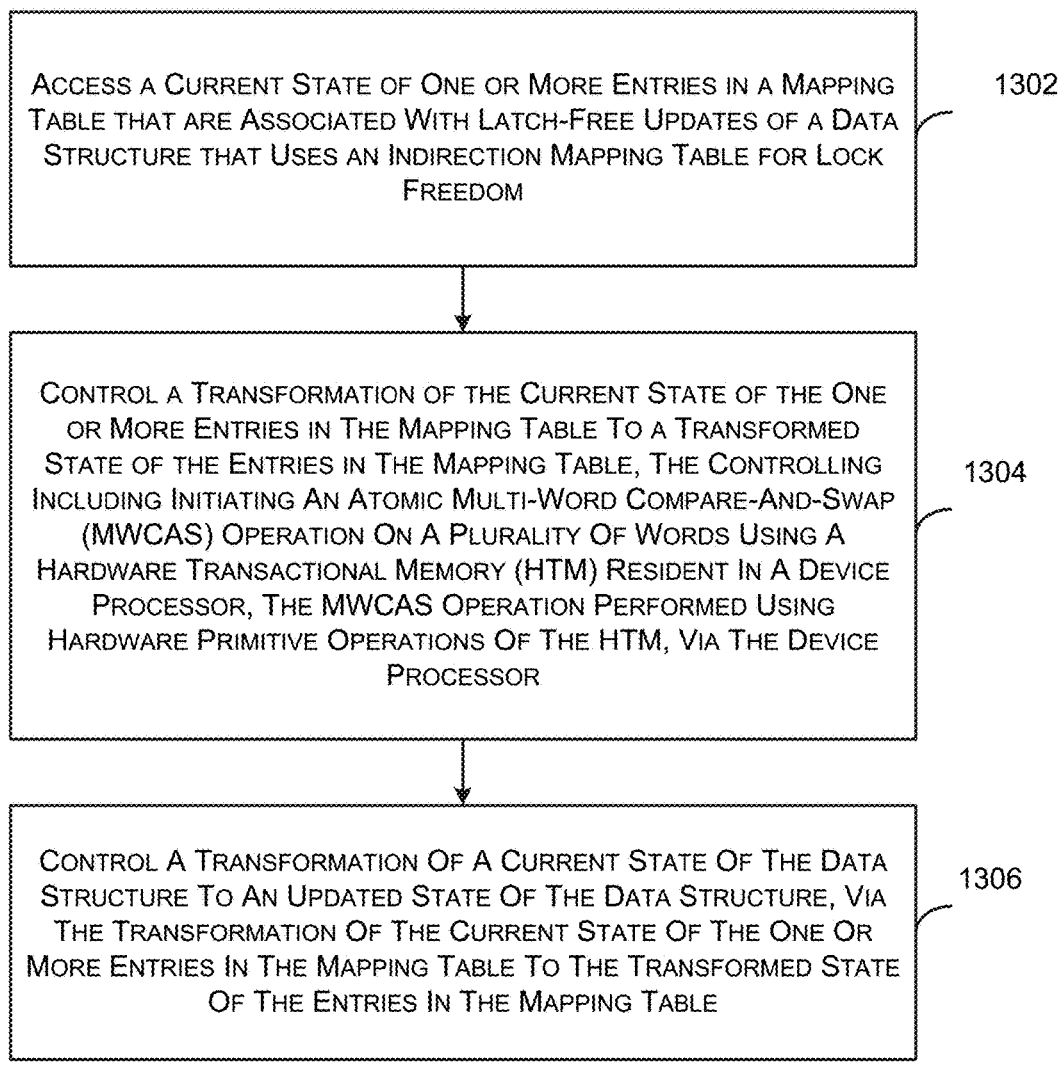
FIG. 13 is a flowchart illustrating example operations of the system of FIG. 11.

FIG. 13 is a flowchart illustrating example operations of the system of FIG. 11, according to example embodiments. As shown in the example of FIG. 13, a current state of one or more entries in a mapping table that are associated with latch-free updates of a data structure that uses an indirection mapping table for lock freedom is accessed (1302).

A transformation of the current state of the one or more entries in the mapping table to a transformed state of the entries in the mapping table is controlled, the controlling including initiating an atomic multi-word compare-and-swap (MWCAS) operation on a plurality of words using a hardware transactional memory (HTM) resident in a device processor, the MWCAS operation performed using hardware primitive operations of the HTM, via the device processor (1304).

A transformation of a current state of the data structure to an updated state of the data structure is controlled, via the transformation of the current state of the one or more entries in the mapping table to the transformed state of the entries in the mapping table (1306).

For example, controlling the transformation of the current state of the one or more entries in the mapping table includes bracketing accesses to the mapping table in a hardware transaction.

For example, bracketing accesses to the mapping table in the hardware transaction includes bracketing accesses for an entire index traversal in the hardware transaction.

FIG. 14 is a flowchart illustrating example operations of the system of FIG. 11, according to example embodiments. As shown in the example of FIG. 14, a transformation of a first state of one or more entries in a mapping table to a second state of the entries in the mapping table that are associated with latch-free updates that are associated with a data structure that uses an indirection mapping table that includes the mapping table, is controlled, the controlling including initiating an atomic multi-word compare-and-swap (MWCAS) operation on a plurality of words using a hardware transactional memory (HTM) resident in a device processor, the MWCAS operation performed using hardware primitive operations of the HTM, via the device processor (1402).

For example, controlling the transformation includes controlling progress of hardware transactions that are not guaranteed to succeed, by bracketing accesses to the mapping table in hardware transactions, and by providing an atomic MWCAS with exclusive access to target words via lockaside operations.

One skilled in the art of computing will appreciate that many other types of techniques may be used for achieving high performance transaction processing.

Features discussed herein are provided as example embodiments that may be implemented in many different ways that may be understood by one of skill in the art of computing, without departing from the spirit of the discussion herein. Such features are to be construed only as example embodiment features, and are not intended to be construed as limiting to only those detailed descriptions.

In this context, a "processor" may include a single processor or multiple processors configured to process instructions associated with a computing system. A processor may thus include one or more processors executing instructions in parallel and/or in a distributed manner.

For example, the system 1100 may include one or more processors. For example, the system 1100 may include at least one tangible computer-readable storage medium storing instructions executable by the one or more processors, the executable instructions configured to cause at least one processor to perform operations associated with various example components included in the system 1100, as discussed herein. For example, the one or more processors may be included in at least one processing apparatus. One skilled in the art of computing will understand that there are many configurations of processors and processing apparatuses that may be configured in accordance with the discussion herein, without departing from the spirit of such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further, the memory may be distributed among a plurality of processors.

IV. Aspects of Certain Embodiments

Features discussed herein are provided as example embodiments that may be implemented in many different ways that may be understood by one of skill in the art of computing, without departing from the spirit of the discussion herein. Such features are to be construed only as example embodiment features, and are not intended to be construed as limiting to only those detailed descriptions.

As discussed herein, an example system includes at least one hardware device processor, and a computer-readable storage medium storing executable instructions that, when executed, cause one or more of the at least one hardware device processor to control a transformation of a current state of one or more entries in a mapping table to an updated state of the entries in the mapping table in a latch-free manner by initiating an atomic multi-word compare-and-swap (MWCAS) operation on a plurality of words using a hardware transactional memory (HTM) resident in the device processor, the MWCAS operation using hardware primitive operations of the HTM, the one or more mapping table entries associated with a lock-free index of a database.

For example, the executable instructions, when executed, cause the one or more of the at least one hardware device processor to control the transformation by bracketing accesses to the mapping table in a hardware transaction.

For example, controlling the transformation includes bracketing an entire index traversal in a hardware transaction.

For example, controlling the transformation includes bracketing only singleton read operations in a hardware transaction.

For example, controlling the transformation includes performing read operations non-transactionally.

For example, the executable instructions, when executed, cause the one or more of the at least one hardware device processor to control the transformation by bracketing only multi-slot updates to the mapping table in hardware transactions.

For example, the executable instructions, when executed, cause the one or more of the at least one hardware device processor to control the transformation by bracketing accesses to the mapping table in hardware transactions, and avoid memory page faults by executing a fallback code path.

For example, the executable instructions, when executed, cause the one or more of the at least one hardware device processor to avoid the memory page faults by executing a fallback code path that pre-faults addresses to be executed by one or more of the hardware transactions.

For example, pre-faulting the addresses to be executed by the one or more of the hardware transactions includes executing an atomic MWCAS to read the values of respective target words and to perform a compare and swap (CAS) operation on each respective read word that assigns to each respective target word location, the read value of the respective each read word.

For example, the executable instructions, when executed, cause the one or more of the at least one hardware device processor to retry executing the fallback code path that pre-faults addresses to be executed by one or more of the hardware transactions.

For example, the retry of executing the fallback code path is performed for a configurable number of retries.

For example, the executable instructions, when executed, cause the one or more of the at least one hardware device processor to control the transformation by bracketing accesses to the mapping table in hardware transactions, and provide an atomic MWCAS with exclusive access to target words via lockaside operations.

For example, the executable instructions, when executed, cause the one or more of the at least one hardware device processor to maintain a respective thread-local read/write lock for each thread of a plurality of concurrently executing threads, and before starting an operation by one of the threads, acquire exclusive access for the one of the threads, to the respective thread-local read/write lock for the one of the threads.

The lockaside operations include obtaining exclusive access to the mapping table by acquiring all respective thread-local read/write locks from other threads of the plurality of concurrently executing threads.

For example, obtaining the exclusive access to the mapping table includes acquiring all respective thread-local read/write locks from other threads of the plurality of concurrently executing threads, in a deterministic order.

For example, the executable instructions, when executed, cause the one or more of the at least one hardware device processor to modify target mapping table entries, by the one of the threads, and release all the respective thread-local read/write locks from the other threads, after the modifying of the target mapping table entries.

A method includes controlling a transformation of a first state of one or more entries in a mapping table to a second state of the entries in the mapping table that are associated with latch-free updates that are associated with a data structure that uses an indirection mapping table that includes the mapping table, the controlling including initiating an atomic multi-word compare-and-swap (MWCAS) operation on a plurality of words using a hardware transactional memory (HTM) resident in a device processor, the MWCAS operation performed using hardware primitive operations of the HTM, via the device processor.

For example, controlling the transformation includes controlling progress of hardware transactions that are not guaranteed to succeed, by bracketing accesses to the mapping table in hardware transactions, and by providing an atomic MWCAS with exclusive access to target words via lockaside operations.

A computer program product includes a computer-readable storage medium storing executable instructions that when executed by at least one processor cause at least one computing device to access a current state of one or more entries in a mapping table that are associated with latch-free updates of a data structure that uses an indirection mapping table for lock freedom, control a transformation of the current state of the one or more entries in the mapping table to a transformed state of the entries in the mapping table, the controlling including initiating an atomic multi-word compare-and-swap (MWCAS) operation on a plurality of words using a hardware transactional memory (HTM) resident in a device processor, the MWCAS operation performed using hardware primitive operations of the HTM, via the device processor, and control a transformation of a current state of the data structure to an updated state of the data structure, via the transformation of the current state of the one or more entries in the mapping table to the transformed state of the entries in the mapping table.

For example, controlling the transformation of the current state of the one or more entries in the mapping table includes bracketing accesses to the mapping table in a hardware transaction.

For example, bracketing accesses to the mapping table in the hardware transaction includes bracketing accesses for an entire index traversal in the hardware transaction.

One skilled in the art of computing will understand that there may be many ways of accomplishing the features discussed herein.

Customer privacy and confidentiality have been ongoing considerations in computing environments for many years. Thus, example techniques for updating a database may use user input and/or data provided by users who have provided permission via one or more subscription agreements (e.g., "Terms of Service" (TOS) agreements) with associated applications or services associated with such techniques. For example, users may provide consent to have their input/data transmitted and stored on devices, though it may be explicitly indicated (e.g., via a user accepted agreement) that each party may control how transmission and/or storage occurs, and what level or duration of storage may be maintained, if any. Further, identifiers that may be used to identify devices used by a user may be obfuscated, e.g., by hashing actual user information. It is to be understood that any user input/data may be obtained in accordance with the privacy laws and regulations of any relevant jurisdiction.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in signals (e.g., a pure signal such as a pure propagated signal). Such implementations will be referred to herein as implemented via a "computer-readable transmission medium," which does not qualify herein as a "computer-readable storage medium" or a "computer-readable storage device" as discussed below.

Alternatively, implementations may be implemented via a machine usable or machine readable storage device (e.g., a magnetic or digital medium such as a Universal Serial Bus (USB) storage device, a tape, hard disk drive, compact disk (CD), digital video disk (DVD), etc.), storing executable instructions (e.g., a computer program), for execution by, or to control the operation of, a computing apparatus (e.g., a data processing apparatus), e.g., a programmable processor, a special-purpose processor or device, a computer, or multiple computers. Such implementations may be referred to herein as implemented via a "computer-readable storage medium" or a "computer-readable storage device" and are thus different from implementations that are purely signals such as pure propagated signals (and thus do not qualify herein as a "computer-readable transmission medium" as discussed above). Thus, as used herein, a reference to a "computer-readable storage medium" or a "computer-readable storage device" specifically excludes signals (e.g., propagated signals) per se.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one hardware device processor; and
   a computer-readable storage medium storing executable instructions that, when executed, cause the at least one hardware device processor to:
   control a page merge transformation of a current state of a mapping table to an updated state in a latch-free manner using a single hardware transaction in a hardware transactional memory, the single hardware transaction comprising at least one multi-word compare-and-swap operation that:
   performs a first atomic step of the page merge transformation by marking a deleted page as deleted;
   performs a second atomic step of the page merge transformation by merging an existing key of the deleted page to another page; and
   performs a third atomic step of the page merge transformation by deleting an identifier of the deleted page from a parent page,
   the mapping table being associated with a lock-free index of a database.

2. The system of claim 1, wherein the third atomic step performed by the at least one multi-word compare-and-swap operation includes deleting at least one search key from the parent page.

3. The system of claim 1, wherein the executable instructions, when executed, cause the at least one hardware device processor to:
   bracket an entire index traversal in another single hardware transaction.

4. The system of claim 1, wherein the at least one multi-word compare-and-swap operation consists of a single multi-word compare-and-swap operation.

5. The system of claim 1, wherein the executable instructions, when executed, cause the at least one hardware device processor to:
   perform one or more read operations non-transactionally.

6. The system of claim 1, wherein the executable instructions, when executed, cause the at least one hardware device processor to:
   bracket a plurality of multi-slot updates to the mapping table in other hardware transactions; and
   perform singleton read operations and singleton write operations on the mapping table without using hardware transactions.

7. The system of claim 1, wherein the executable instructions, when executed, cause the at least one hardware device processor to:
   avoid one or more memory page faults by executing a fallback code path.

8. The system of claim 7, wherein the fallback code path pre-faults particular addresses to be executed by one or more other hardware transactions.

9. The system of claim 8, wherein the executable instructions, when executed, cause the at least one hardware device processor to:
   retry executing the fallback code path for a configurable number of retries.

10. The system of claim 1, wherein the executable instructions, when executed, cause the at least one hardware device processor to:
    control another transformation by bracketing accesses to the mapping table in another single hardware transaction; and
    provide another atomic multi-word compare-and-swap operation with exclusive access to target words via lockaside operations inside the another single hardware transaction.

11. The system of claim 10, wherein the executable instructions, when executed, cause the at least one hardware device processor to:
    maintain a respective thread-local read/write lock for each thread of a plurality of concurrently executing threads; and before starting an operation by an individual thread, acquire exclusive access to an individual thread-local read/write lock for the individual thread, wherein the lockaside operations include obtaining exclusive access to the mapping table by acquiring other respective thread-local read/write locks from other threads of the plurality of concurrently executing threads.

12. The system of claim 11, wherein the executable instructions, when executed, cause the at least one hardware device processor to:

acquire the other respective thread-local read/write locks in a deterministic order.

13. The system of claim 12, wherein the executable instructions, when executed, cause the at least one hardware device processor to:

modify target mapping table entries, by the individual thread, and release the other respective thread-local read/write locks after the target mapping table entries are modified.

14. A method performed via a device processor of a system having a hardware transactional memory, the method comprising:

controlling a page merge transformation of a first state of a mapping table to a second state of the mapping table, the controlling including initiating, within a single hardware transaction on the hardware transactional memory, at least one multi-word compare-and-swap operation, wherein:

the at least one multi-word compare-and-swap operation marks a deleted page as deleted;

the at least one multi-word compare-and-swap operation merges an existing key of the deleted page to another page; and the at least one multi-word compare-and-swap operation deletes an identifier of the deleted page from a parent page.

15. The method of claim 14, the at least one multi-word compare-and-swap operation consisting of a single multi-word compare-and-swap operation.

16. A computer program product comprising a computer-readable storage medium storing executable instructions that, when executed by at least one processor, cause the at least one processor to:

access a current state of one or more entries in a mapping table for a database index; and using a single hardware transaction in a hardware transactional memory, transform the current state of the mapping table to a transformed state, the single hardware transaction comprising a page merge operation involving at least one multi-word compare-and-swap operation, the at least one multi-word compare-and-swap operation marking a deleted page as deleted;

the at least one multi-word compare-and-swap operation merging an existing key of the deleted page to another page; and the at least one multi-word compare-and-swap operation deleting an identifier of the deleted page from a parent page.

17. The computer program product of claim 16, wherein the mapping table maps logical page identifiers to physical addresses.

18. The computer program product of claim 17, wherein the physical addresses comprise memory addresses.

19. The computer program product of claim 17, wherein the physical addresses comprise stable storage addresses.

20. The computer program product of claim 16, the database index comprising a tree structure.

* * * * *